United States Patent
Mitsutsuji et al.

(10) Patent No.: US 10,584,218 B2
(45) Date of Patent: Mar. 10, 2020

(54) FIBER-REINFORCED THERMOPLASTIC RESIN MOLDED ARTICLE, AND FIBER-REINFORCED THERMOPLASTIC RESIN MOLDING MATERIAL

(71) Applicant: Toray Industries, Inc., Tokyo (JP)

(72) Inventors: Yuki Mitsutsuji, Nagoya (JP); Shin Hirata, Nagoya (JP); Atsuki Tsuchiya, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 201 days.

(21) Appl. No.: 15/770,132

(22) PCT Filed: Oct. 21, 2016

(86) PCT No.: PCT/JP2016/081266
§ 371 (c)(1),
(2) Date: Apr. 20, 2018

(87) PCT Pub. No.: WO2017/073483
PCT Pub. Date: May 4, 2017

(65) Prior Publication Data
US 2018/0312648 A1 Nov. 1, 2018

(30) Foreign Application Priority Data
Oct. 30, 2015 (JP) .................. 2015-214363

(51) Int. Cl.
| | | |
|---|---|---|
| *B29B 9/06* | (2006.01) | |
| *C08J 5/04* | (2006.01) | |
| *C08K 7/06* | (2006.01) | |
| *C08L 101/00* | (2006.01) | |
| *C08J 5/06* | (2006.01) | |
| *C08L 23/12* | (2006.01) | |
| *C08K 7/02* | (2006.01) | |
| *B29B 15/14* | (2006.01) | |
| *B29K 101/12* | (2006.01) | |
| *B29K 307/04* | (2006.01) | |

(52) U.S. Cl.
CPC .............. *C08J 5/042* (2013.01); *B29B 9/06* (2013.01); *C08J 5/046* (2013.01); *C08J 5/047* (2013.01); *C08J 5/06* (2013.01); *C08K 7/02* (2013.01); *C08K 7/06* (2013.01); *C08L 23/12* (2013.01); *C08L 101/00* (2013.01); *B29B 15/14* (2013.01); *B29K 2101/12* (2013.01); *B29K 2307/04* (2013.01); *C08J 2300/22* (2013.01); *C08J 2323/12* (2013.01); *C08J 2369/00* (2013.01); *C08J 2423/26* (2013.01)

(58) Field of Classification Search
USPC ....................................................... 523/220
See application file for complete search history.

(56) References Cited

U.S. PATENT DOCUMENTS

2015/0291789 A1    10/2015    Hirata et al.

FOREIGN PATENT DOCUMENTS

| | | |
|---|---|---|
| JP | 63-203306 A | 8/1988 |
| JP | 8-20651 A | 1/1996 |
| JP | 2002-129027 A | 5/2002 |
| JP | 2009-13331 A | 1/2009 |
| JP | 2009-114332 A | 5/2009 |
| JP | 2011-89060 A | 5/2011 |
| JP | 2012-184286 A | 9/2012 |
| JP | 2014-051555 A | 3/2014 |
| JP | 2014-62143 A | 4/2014 |
| JP | 2015-44914 A | 3/2015 |
| JP | 2015-143339 A | 8/2015 |
| WO | 2014/098103 A1 | 6/2014 |

OTHER PUBLICATIONS

The Extended European Search Report dated Aug. 6, 2019, of counterpart European Application No. 16859713.6.

*Primary Examiner* — Terressa Boykin
(74) *Attorney, Agent, or Firm* — DLA Piper LLP (US)

(57) ABSTRACT

A fiber reinforced thermoplastic resin molded article includes 5 to 45 parts by weight of carbon fibers (A), 1 to 45 parts by weight of organic fibers (B), and 10 to 94 parts by weight of a thermoplastic resin (C), based on 100 parts by weight of the total amount of the carbon fibers (A), the organic fibers (B), and the thermoplastic resin (C). The carbon fibers (A) in the fiber reinforced thermoplastic resin molded article have an average fiber length ($L_A$) of 0.3 to 3 mm. The organic fibers (B) in the fiber reinforced thermoplastic resin molded article have an average fiber length ($L_B$) of 0.5 to 5 mm, and a number average fiber diameter ($d_B$) of 35 to 300 μm. The fiber reinforced thermoplastic resin molded article is excellent in impact strength and surface appearance.

11 Claims, 2 Drawing Sheets

FIBER-REINFORCED THERMOPLASTIC RESIN MOLDED ARTICLE, AND FIBER-REINFORCED THERMOPLASTIC RESIN MOLDING MATERIAL

TECHNICAL FIELD

This disclosure relates to a fiber reinforced thermoplastic resin molded article comprising carbon fibers and organic fibers, and a fiber reinforced thermoplastic resin molding material.

BACKGROUND

Molded articles comprising reinforcement fibers and a thermoplastic resin are lightweight and have excellent mechanical properties, and thus have been widely used, for example, in sports applications, aerospace applications, and general industrial applications. Examples of such reinforcement fibers include metal fibers such as aluminum fibers and stainless fibers, inorganic fibers such as silicon carbide fibers and carbon fibers, organic fibers such as aramid fibers and poly p-phenylene benzoxazole (PBO) fibers, and the like. Among these, carbon fibers are suitable in terms of the balance between specific strength, specific rigidity and lightness; and in particular, polyacrylonitrile-based carbon fibers are suitably used.

The mechanical properties of a carbon fiber reinforced thermoplastic resin molded article can be enhanced, for example, by increasing the content of carbon fibers, but an increased content of carbon fibers tends to result in uneven distribution of the carbon fibers in the carbon fiber reinforced thermoplastic resin molded article, often causing a reduction in impact strength. Thus, alternatively, the mechanical properties of a carbon fiber reinforced thermoplastic resin molded article can be enhanced, for example, by adding organic fibers having flexibility and high elongation at break in addition to the carbon fibers.

As a long-fiber reinforced composite resin composition having a high mechanical strength and provided with conductivity, a long-fiber reinforced composite resin composition comprising an olefin resin, organic long fibers, and carbon fibers is disclosed (see, for example, JP 2009-114332 A). Further, as a fiber reinforced plastic excellent in impact resistance, a fiber reinforced plastic composed of reinforcement fibers and a thermoplastic resin is proposed, wherein the reinforcement fibers are composed of carbon fibers and heat-resistant organic fibers (see, for example, JP 2014-62143 A). In addition, as a fiber reinforced thermoplastic resin molded article excellent in impact strength and low-temperature impact strength, a fiber reinforced thermoplastic resin molded article including carbon fibers, organic fibers and a thermoplastic resin is proposed, wherein the carbon fibers and the organic fibers each have an average fiber length within a specific range, and the average straight-line distance between two edges of a single fiber and the average fiber length of the carbon fibers and the organic fibers are in a specific relationship (see, for example, WO 2014/098103).

However, a molded article obtained using the technique disclosed in JP 2009-114332 A or JP 2014-62143 A has an improved impact strength but yet has a problem of deteriorating a surface appearance of molded article by adding organic fibers. Further, although the technique disclosed in WO 2014/098103 permits production of a molded article with a significantly improved impact strength and an improved surface appearance by adjusting fiber length to the specific range. However, a further improvement in surface appearance along with maintaining impact strength of members and parts is expected with expanding various applications in recent years.

It could therefore be helpful to provide a fiber reinforced thermoplastic resin molded article excellent in impact strength and surface appearance.

SUMMARY

We thus provide:

A fiber reinforced thermoplastic resin molded article, comprising: 5 to 45 parts by weight of carbon fibers (A); 1 to 45 parts by weight of organic fibers (B); and 10 to 94 parts by weight of a thermoplastic resin (C), based on 100 parts by weight of the total amount of the carbon fibers (A), the organic fibers (B), and the thermoplastic resin (C), wherein the carbon fibers (A) in the fiber reinforced thermoplastic resin molded article have an average fiber length ($L_A$) of 0.3 to 3 mm, and wherein the organic fibers (B) in the fiber reinforced thermoplastic resin molded article have an average fiber length ($L_B$) of 0.5 to 5 mm, and a number average fiber diameter ($d_B$) of 35 to 300 µm.

Further, the fiber reinforced thermoplastic resin molding material has either of the following constructions:

A fiber reinforced thermoplastic resin molding material, comprising: 5 to 45 parts by weight of carbon fibers (A), 1 to 45 parts by weight of organic fibers (B), 10 to 94 parts by weight of a thermoplastic resin (C), and 1 to 25 parts by weight of a compound (D) having a melt viscosity at 200° C. that is lower than that of the thermoplastic resin (C), based on 100 parts by weight of the total amount of the carbon fibers (A), the organic fibers (B), and the thermoplastic resin (C), wherein:

the organic fibers (B) have a number average fiber diameter ($d_B$) of 35 to 300 µm;

the thermoplastic resin (C) is contained at the outer side of a composite (F) obtained by impregnating a fiber bundle (E) comprising the carbon fibers (A) and the organic fibers (B) with the compound (D);

the carbon fibers (A) and the organic fibers (B) are unevenly distributed in a cross section of the fiber bundle (E); and the length of the fiber bundle (E) and the length of the fiber reinforced thermoplastic resin molding material are substantially the same.

A fiber reinforced thermoplastic resin molding material, comprising:

a carbon fiber reinforced thermoplastic resin molding material (X) comprising 5 to 45 parts by weight of carbon fibers (A), 35 to 94 parts by weight of a thermoplastic resin (C), and 1 to 25 parts by weight of a compound (D) having a melt viscosity at 200° C. that is lower than that of the thermoplastic resin (C), based on 100 parts by weight of the total amount of the carbon fibers (A), the thermoplastic resin (C), and the compound (D) having a melt viscosity at 200° C. that is lower than that of the thermoplastic resin (C), wherein the thermoplastic resin (C) is contained at the outer side of a composite (G) obtained by impregnating the carbon fibers (A) with the compound (D), and the length of the carbon fibers (A) and the length of the carbon fiber reinforced thermoplastic resin molding material are substantially the same; and an organic fiber reinforced thermoplastic resin molding material (Y) comprising 1 to 45 parts by weight of organic fibers (B), 35 to 94 parts by weight of a thermoplastic resin (H), and 1 to 25 parts by weight of a compound (I) having a melt viscosity at 200° C. that is lower than that of the thermoplastic resin (H), based on 100 parts by weight of the total amount of the organic fibers (B), the thermoplastic resin (H), and the compound (I) having a melt viscosity at 200° C. that is lower than that of the thermoplastic resin (H), wherein the organic fibers (B) have a number average fiber diameter ($d_B$) of 35 to 300 μm.

The fiber reinforced thermoplastic resin molded article provides a high reinforcing effect and has an excellent impact strength and a surface appearance. The fiber reinforced thermoplastic resin molded article is extremely useful for electrical and electronic equipment, office automation equipment, household electrical appliances, housings, automotive parts and the like.

DESCRIPTION OF SYMBOLS

Figure 1:
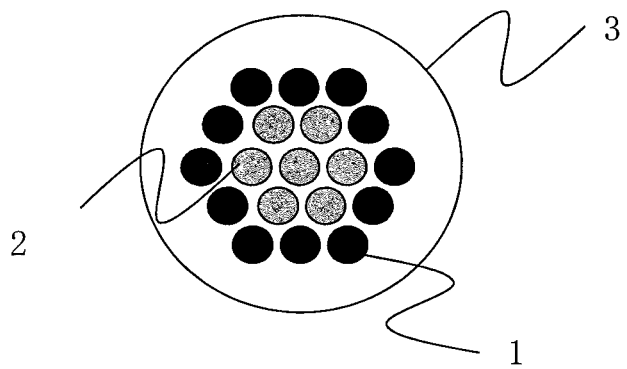
FIG. 1 is a schematic view illustrating a molding material cross section in an example where the carbon fibers (A) envelop the organic fibers (B) in a cross section of the fiber bundle (E).

1: Carbon fiber
2: Organic fiber
3: Thermoplastic resin
4: Fiber contour A
5: Fiber contour A' opposite to fiber contour A
6: Shortest distance

DETAILED DESCRIPTION

The fiber reinforced thermoplastic resin molded article (hereinafter, sometimes referred to as "molded article") comprises at least carbon fibers (A), organic fibers (B), and a thermoplastic resin (C). It is preferred that the molded article further comprises a compound (D) having a melt viscosity at 200° C. that is lower than that of the thermoplastic resin (C).

The carbon fibers (A) are in the form of a continuous reinforcement fiber filament, and serve as a reinforcement material to provide the molded article with high mechanical properties. The organic fibers (B) are also in the form of a continuous reinforcement fiber filament, and have flexibility. The organic fibers (B), due to their flexibility, are less likely to break during molding, and likely to be present in a curved form in the molded article while keeping their long fiber length. Thus, the use of a fiber bundle (E) including the organic fibers (B) as a reinforcement material allows for providing a high impact strength to the resulting molded article, as compared to using a fiber bundle consisting of the carbon fibers (A), which are rigid and brittle and thus less prone to entanglement but susceptible to breakage. The thermoplastic resin (C), which is a matrix resin having a relatively high viscosity and excellent physical properties such as toughness, firmly holds the carbon fibers (A) and the organic fibers (B) in the molded article.

The molded article contains the carbon fibers (A) in an amount of 5 to 45 parts by weight (5 parts by weight or more and 45 parts by weight or less), based on 100 parts by weight of the total amount of the carbon fibers (A), the organic fibers (B), and the thermoplastic resin (C). When the content of the carbon fibers (A) is less than 5 parts by weight, the molded article will have reduced flexural properties and impact strength. The content of the carbon fibers (A) is preferably 10 parts by weight or more. When the content of the carbon fibers (A) is more than 45 parts by weight, on the other hand, the dispersibility of the carbon fibers (A) in the molded article will be reduced, often causing a reduction in the impact strength and a poor surface appearance of the resulting molded article. The content of the carbon fibers (A) is preferably 30 parts by weight or less.

Examples of the type of the carbon fibers (A) include, but are not limited to, PAN-based carbon fibers, pitch-based carbon fibers, cellulose-based carbon fibers, vapor-grown carbon fibers, and graphitized fibers thereof. The PAN-based carbon fibers are carbon fibers made from polyacrylonitrile fibers. The pitch-based carbon fibers are carbon fibers made from petroleum tar or petroleum pitch. The cellulose-based carbon fibers are carbon fibers made from materials such as viscose rayon and cellulose acetate. The vapor-grown carbon fibers are carbon fibers made from materials such as hydrocarbon. Among these, the PAN-based carbon fibers are preferred in terms of excellent balance between strength and elastic modulus. To provide conductivity, carbon fibers coated with a metal such as nickel, copper, or ytterbium can also be used.

The carbon fibers (A) preferably have a surface oxygen concentration ratio [O/C], which is the ratio of oxygen atoms (O) to carbon atoms (C) on the fiber surface as measured by X-ray photoelectron spectroscopy, of 0.05 to 0.5. When the surface oxygen concentration ratio is 0.05 or more, a sufficient amount of functional groups can be secured on the carbon fiber surface to provide stronger adhesion, thereby further improving flexural strength and tensile strength. The surface oxygen concentration ratio is more preferably 0.08 or more, and still more preferably 0.1 or more. The upper limit of the surface oxygen concentration ratio is not particularly limited. In general, the upper limit is preferably 0.5 or less, in terms of the balance between handleability and productivity of the carbon fibers. The surface oxygen concentration ratio is more preferably 0.4 or less, and still more preferably 0.3 or less.

The surface oxygen concentration ratio of the carbon fibers (A) is determined by X-ray photoelectron spectroscopy according to the following procedure. First, when a sizing agent and the like are deposited on the surface of the carbon fibers, the sizing agent and the like deposited on the carbon fiber surface are removed with a solvent. A bundle of carbon fibers is cut into a length of 20 mm, and the carbon fibers are spread on a sample support made of copper to be used as measurement samples. The measurement samples are set in a sample chamber of an X-ray photoelectron spectroscopy apparatus, and the measurement is carried out while maintaining the interior of the sample chamber at $1\times10^{-8}$ Torr and using AlKα1, 2 as an X-ray source. As a correction value of a peak associated with electrification during the measurement, the kinetic energy value (K.E.) of the main peak of $C_{1s}$ is set at 1,202 eV. The $C_{1s}$ peak area is determined by drawing a straight baseline in the K.E. range of 1,191 to 1,205 eV. The $O_{1s}$ peak area is determined by drawing a straight baseline in the K.E. range of 947 to 959 eV.

The surface oxygen concentration ratio is calculated as a ratio of the number of atoms, from the ratio of the $O_{1s}$ peak area to the $C_{1s}$ peak area, using an apparatus-specific sensitivity correction value. When an X-ray photoelectron spectroscopy apparatus model ES-200 manufactured by Kokusai Denki Co., Ltd. is used, the sensitivity correction value is set at 1.74.

Examples of means of adjusting the surface oxygen concentration ratio [O/C] to 0.05 to 0.5 include, but are not particularly limited to, treatments such as electrolytic oxidation, chemical oxidation, and gas phase oxidation, among which electrolytic oxidation is preferred.

When the carbon fibers (A) are formed into a reinforcement fiber filament, the number of single fibers in the filament is preferably, but not particularly limited to, 100 to 350,000, and more preferably 20,000 to 100,000 from the standpoint of productivity.

To improve the adhesion between the carbon fibers (A) and the thermoplastic resin (C) as a matrix resin, and the like, the carbon fibers (A) may be subjected to a surface treatment. Examples of the surface treatment include electrolytic treatment, ozonation treatment, and UV treatment.

To prevent fluffing of the carbon fibers (A) or improve the adhesion between the carbon fibers (A) and the thermoplastic resin (C) as a matrix resin, and the like, the carbon fibers (A) may be provided with a sizing agent. Providing the carbon fibers (A) with a sizing agent allows for further improving the adhesion of the carbon fibers (A) to the thermoplastic resin (C), as well as the flexural strength and the impact strength of the molded article.

Specific examples of sizing agents include epoxy resins, phenolic resins, polyethylene glycol, polyurethanes, polyesters, emulsifiers, and surfactants. These may be used in combination of two or more. The sizing agent is preferably water-soluble or water-dispersible, and epoxy resins which have high wettability with the carbon fibers (A) are preferred. In particular, polyfunctional epoxy resins are more preferred.

Examples of polyfunctional epoxy resins include bisphenol A epoxy resins, bisphenol F epoxy resins, aliphatic epoxy resins, and phenol novolac epoxy resins. Among these, aliphatic epoxy resins, which readily exhibit adhesion to a matrix resin, are preferred. Aliphatic epoxy resins, due to their flexible backbones, tend to have a structure with high toughness even at a high crosslink density. The presence of an aliphatic epoxy resin between the carbon fibers and the thermoplastic resin makes the fibers flexible and less prone to delamination, thereby allowing for a further improvement in the strength of the resulting molded article.

Examples of polyfunctional aliphatic epoxy resins include diglycidyl ether compounds, and polyglycidyl ether compounds. Examples of the diglycidyl ether compounds include ethylene glycol diglycidyl ether, polyethylene glycol diglycidyl ethers, propylene glycol diglycidyl ether, polypropylene glycol diglycidyl ethers, 1,4-butanediol diglycidyl ether, neopentyl glycol diglycidyl ether, polytetramethylene glycol diglycidyl ether, and polyalkylene glycol diglycidyl ethers. Further, examples of the polyglycidyl ether compounds include glycerol polyglycidyl ether, diglycerol polyglycidyl ether, polyglycerol polyglycidyl ethers, sorbitol polyglycidyl ether, arabitol polyglycidyl ether, trimethylolpropane polyglycidyl ethers, trimethylolpropane glycidyl ether, pentaerythritol polyglycidyl ether, and aliphatic polyols.

Among the above described aliphatic epoxy resins, trifunctional or higher aliphatic epoxy resins are preferred, and more preferred are aliphatic polyglycidyl ether compounds containing three or more highly reactive glycidyl groups. The aliphatic polyglycidyl ether compounds have a good balance between flexibility, crosslink density, and compatibility with a matrix resin, and can further improve the adhesion. Among these, glycerol polyglycidyl ether, diglycerol polyglycidyl ether, polyethylene glycol glycidyl ethers, and polypropylene glycol glycidyl ethers are still more preferred.

The amount of sizing agent deposited is preferably 0.01% by weight or more and 10% by weight or less based on 100% by weight of the total weight of the carbon fibers (A) and the sizing agent. When the amount of sizing agent deposited is 0.01% by weight or more, the adhesion to the thermoplastic resin (C) is further improved. The amount is more preferably 0.05% by weight or more, and still more preferably 0.1% by weight or more. When the amount of sizing agent deposited is 10% by weight or less, on the other hand, the physical properties of the thermoplastic resin (C) can be maintained at a higher level. The amount is more preferably 5% by weight or less, and more preferably 2% by weight or less. The amount of sizing agent deposited can be determined, for example, by heating the carbon fibers on the surface of which the sizing agent is deposited, at 500° C. for 15 minutes under a nitrogen atmosphere, and calculating the weight of the sizing agent removed by heating at 500° C. for 15 minutes, from the change in weight of the carbon fibers before and after the heating.

The means of providing a sizing agent is not particularly limited, and examples thereof include a method in which a sizing agent is dissolved or dispersed in a solvent (including a dispersion medium, in the case of dispersing the sizing agent) to prepare a sizing treatment liquid, and the resulting sizing treatment liquid is applied to the carbon fibers, followed by drying and vaporizing the solvent. Examples of the method of applying the sizing treatment liquid to the carbon fibers include: immersing the carbon fibers in the sizing treatment liquid via a roller, bringing the carbon fibers into contact with a roller to which the sizing treatment liquid is attached, and spraying the sizing treatment liquid onto the carbon fibers in the form of a mist. The method of applying the sizing treatment liquid may be a batch method or a continuous method, but preferred is the continuous method which allows for achieving higher productivity and smaller variation. In such a case, it is preferable to control conditions such as the concentration of the sizing treatment liquid, temperature, and yarn tension of the fibers so that the sizing agent can be deposited on the carbon fibers (A) uniformly and in an amount within an appropriate range. Further, it is more preferable to excite the carbon fibers (A) with ultrasonic waves when providing the sizing treatment liquid.

The drying temperature and the drying time should be adjusted depending on the amount of sizing agent deposited. To shorten the time required to completely remove and dry the solvent used in the sizing treatment liquid, and at the same time, prevent thermal degradation of the sizing agent and thereby preventing the sized carbon fibers (A) from becoming rigid and poorly spreadable, the drying temperature is preferably 150° C. or more and 350° C. or less, and more preferably 180° C. or more and 250° C. or less.

Examples of the solvent to be used in the sizing treatment liquid include water, methanol, ethanol, dimethylformamide, dimethylacetamide, and acetone. Among these, water is preferred from the standpoint of ease of handling and disaster prevention. Thus, when a compound insoluble or poorly soluble in water is used as the sizing agent, it is preferable to add an emulsifier and a surfactant to prepare an aqueous dispersion. Specific examples of emulsifiers and surfactants that can be used include anionic emulsifiers such as styrene-maleic anhydride copolymers, olefin-maleic anhydride copolymers, naphthalene sulfonate formalin condensates, and sodium polyacrylate; cationic emulsifiers such as polyethyleneimine and polyvinyl imidazoline; and non-ionic emulsifiers such as nonylphenol ethylene oxide adducts, polyvinyl alcohol, polyoxyethylene ether ester copolymers, and sorbitan ester ethyl oxide adducts. Among these, nonionic emulsifiers which cause little interaction are preferred, because they are less likely to inhibit the adhesive effect of functional groups contained in the sizing agent.

In the molded article, the carbon fibers (A) have an average fiber length ($L_A$) of 0.3 to 3 mm (0.3 mm or more and 3 mm or less). When the average fiber length ($L_A$) of the carbon fibers (A) is less than 0.3 mm, the reinforcing effect of the carbon fibers (A) is not sufficiently exhibited in the molded article, resulting in a decrease in the flexural strength and tensile strength. $L_A$ is preferably 0.5 mm or more. When the average fiber length ($L_A$) of the carbon fibers (A) is more than 3 mm, on the other hand, the entanglement between single fibers of the carbon fibers (A) is increased, making it difficult for the fibers to be uniformly dispersed in the molded article. As a result, the flexural strength, tensile strength and dispersibility are reduced. $L_A$ is preferably 2 mm or less, more preferably 1.5 mm or less, and still more preferably 1.2 mm or less. The "average fiber length" of the carbon fibers (A) refers, not to a simple number average value, but to an average fiber length calculated according to the following equation calculated by applying the method of calculating a weight average molecular weight to fiber length calculation, which takes into account the contribution of fiber length. Note that the following equation is applicable when the fiber diameters and density of the carbon fibers (A) are uniform.

$$\text{Average fiber length} = \Sigma(Mi^2 \times Ni)/\Sigma(Mi \times Ni)$$

Mi: fiber length (mm)
Ni: number of carbon fibers having a fiber length Mi

The above described average fiber length can be measured by the following method. A molded article is heated on a hot stage set at 300° C. in a state sandwiched between glass plates, to form a film in which fibers are uniformly dispersed. The film in which carbon fibers are uniformly dispersed is observed under a light microscope (at 50 to 200×). The fiber lengths of randomly selected 1,000 carbon fibers (A) are measured, and the average fiber length ($L_A$) is calculated according to the above equation.

The average fiber length of the carbon fibers (A) in the molded article can be adjusted, for example, by varying the conditions of molding, and the like. Examples of the conditions of molding, in injection molding, include pressure conditions such as back pressure and holding pressure, time conditions such as injection time and pressure holding time, and temperature conditions such as cylinder temperature and mold temperature. An increase in the pressure conditions such as back pressure allows for an increase in shearing force within a cylinder, thereby enabling to shorten the average fiber length of the carbon fibers (A). Shortening the injection time also allows for an increase in the shearing force during the injection, thereby enabling to shorten the average fiber length of the carbon fibers (A). Further, a decrease in the temperature conditions such as cylinder temperature and metal mold temperature, allows for an increase in the viscosity of the flowing resin and thus an increase in the shearing force, thereby enabling to shorten the average fiber length of the carbon fibers (A). By varying the conditions as appropriate and as described above, it is possible to adjust the average fiber length of the carbon fibers (A) in the molded article within a desired range.

The carbon fibers (A) in the molded article preferably have a number average fiber diameter ($d_A$) of 1 to 20 and more preferably 3 to 15 from the standpoint of mechanical properties and surface appearance of the molded article, but not particularly limited thereto.

The "number average fiber diameter" of the carbon fibers (A) refers to an average fiber diameter calculated according to the following equation.

$$\text{Number average fiber diameter} = \Sigma/(di \times Ni)/\Sigma(Ni)$$

di: fiber diameter (μm)
Ni: number of carbon fibers having a fiber diameter di

Figure 4:
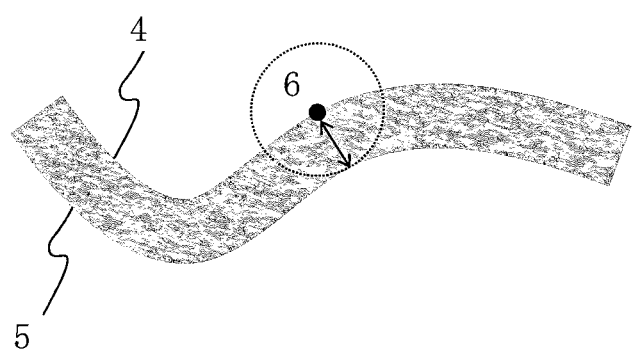
FIG. 4 is a schematic view illustrating the fiber diameter of the carbon fibers (A) or the organic fibers (B).

The number average fiber diameter can be measured by the following method. A molded article is heated on a hot stage set at 300° C. in a state sandwiched between glass plates, to form a film in which fibers are uniformly dispersed. The film in which carbon fibers are uniformly dispersed is observed under a light microscope (at 200 to 1,000×). The fiber diameters of randomly selected 10 carbon fibers (A) are measured, and the number average fiber diameter is calculated according to the above equation. The fiber diameter of a carbon fiber as used herein refers to, as shown in FIG. 4, a shortest distance (6) between an arbitrary point B on a fiber contour A (4) and a fiber contour A' (5) opposite to the fiber contour A (4), in each carbon fiber (A) to be observed. A number average value obtained by: measuring the fiber diameter at randomly selected 20 locations per one piece of carbon fiber (A); and calculating the average of the measured values at the total 200 locations, is defined as the number average fiber diameter. When the number of the carbon fibers (A) present within an observation area is less than 10 pieces, the observation area is moved as appropriate to a new area in which 10 pieces of the carbon fibers (A) can be observed.

Since the fiber diameter of a carbon fiber basically does not change before and after the molding process, it is possible to adjust the fiber diameters of the carbon fibers in the molded article, by selecting, as the carbon fibers to be used in a molding material, carbon fibers having a desired fiber diameter from among carbon fibers having various fiber diameters.

The molded article contains the organic fibers (B) in addition to the carbon fibers (A) described above. Inorganic fibers such as the carbon fibers (A), which are rigid and brittle, are less prone to entanglement but susceptible to breakage. Thus, a fiber bundle consisting of inorganic fibers has drawbacks in that it is susceptible to breakage during the production of a molded article and prone to fall off from the molded article. Incorporation of the organic fibers (B), which are flexible and less susceptible to breakage, can significantly improve the impact strength of the molded article. The content of the organic fibers (B) in the molded article is 1 to 45 parts by weight (1 part by weight or more and 45 parts by weight or less) based on 100 parts by weight of the total amount of the carbon fibers (A), the organic fibers (B) and the thermoplastic resin (C). When the content of the organic fibers (B) is less than 1 part by weight, the impact properties of the molded article will be reduced. The content of the organic fibers (B) is preferably 5 parts by weight or more. When the content of the organic fibers (B) is more than 45 parts by weight, on the other hand, the entanglement between fibers will be increased, leading to a decreased dispersibility of the organic fibers (B) in the molded article, which often causes a reduction in the impact strength and a poor surface appearance of the molded article. The content of the organic fibers (B) is preferably 30 parts by weight or less.

The organic fibers (B) preferably have a tensile break elongation of 10% or more, and more preferably 20% or more to adjust the average fiber length of the organic fibers within the range to be described later, and to further improve the impact strength. On the other hand, the organic fibers (B) preferably have a tensile break elongation of 50% or less, and more preferably 40% or less to improve the strength of the fibers and the rigidity of the molded article.

The tensile break elongation (%) of the organic fibers (B) can be measured by the following method. A tensile test is carried out in a room under standard conditions (20° C., 65% RH) at a chuck distance of 250 mm and a tensile speed of 300 mm/min, and the length at fiber break is measured (breakages in the vicinity of chucks are considered as a chucking breakage and excluded from the resulting data), calculated to the second decimal place by the following equation, and rounded to one decimal place. The average value of the measured values (number of data: n=3) is calculated, and defined as the tensile break elongation.

Tensile break elongation (%)=[(length at break (mm)−250)/250]×100

The organic fibers (B) can be selected as appropriate to the extent that the mechanical properties of the molded article are not significantly reduced. Examples thereof include fibers obtained by spinning: polyolefin resins such as polyethylene and polypropylene; polyamide resins such as nylon 6, nylon 66, and aromatic polyamides; polyester resins such as polyethylene terephthalate and polybutylene terephthalate; and resins such as polyether ketone, polyether sulfone, polyarylene sulfide, and liquid crystal polyester. These may be used in combination of two or more. The organic fibers (B) are preferably selected as appropriate from those described above, depending on the combination with the thermoplastic resin (C), which is a matrix resin. In particular, the organic fibers (B) preferably have a melting temperature that is 30° C. to 150° C. higher, and more preferably, 50° C. to 100° C. higher than the molding temperature (melting temperature) of the thermoplastic resin (C). Alternatively, organic fibers (B) obtained using a resin incompatible with the thermoplastic resin (C) are preferred, because they will be present in the resulting molded article while maintaining their fibrous state, and thus can further improve the impact strength of the molded article. Examples of the organic fibers (B) having a high melting temperature include polyamide fibers, polyester fibers, polyarylene sulfide fibers, and fluororesin fibers, and it is preferable to use at least one type of fibers selected from the group consisting of these fibers, as the organic fibers (B).

In the molded article, the organic fibers (B) have an average fiber length ($L_B$) of 0.5 mm to 5 mm (0.5 mm or more and 5 mm or less). When the average fiber length ($L_B$) of the organic fibers (B) is less than 0.5 mm, the reinforcing effect of the organic fibers (B) is not sufficiently exhibited in the molded article, resulting in a decrease in the impact strength. $L_B$ is preferably 1 mm or more, and more preferably 1.5 mm or more. When the average fiber length ($L_B$) is more than 5 mm, on the other hand, the entanglement between single fibers of the organic fibers (B) is increased, making it difficult for the fibers to be uniformly dispersed in the molded article. As a result, the impact strength is reduced. $L_B$ is preferably 4 mm or less, and more preferably 3 mm or less. Similarly to the case of the carbon fibers (A), the "average fiber length" of the organic fibers (B) refers, not to a simple number average value, but to an average fiber length calculated according to the following equation calculated by applying the method of calculating a weight average molecular weight to fiber length calculation, which takes into account the contribution of fiber length. Note that the following equation is applicable when the fiber diameters and density of the organic fibers (B) are uniform.

Average fiber length=$\Sigma(Mi^2 \times Ni)/\Sigma(Mi \times Ni)$

Mi: fiber length (mm)

Ni: number of organic fibers having a fiber length Mi

The above described average fiber length can be measured by the following method. A molded article is heated on a hot stage set at 300° C. in a state sandwiched between glass plates, to form a film in which fibers are uniformly dispersed. The film in which organic fibers are uniformly dispersed is observed under a light microscope (at 50 to 200×). The fiber lengths of randomly selected 1,000 organic fibers (B) are measured, and the average fiber length ($L_B$) is calculated according to the above equation.

The average fiber length of the organic fibers (B) in the molded article can be adjusted, for example, by appropriately selecting the type of the organic fibers (B) from those described above, or by varying the conditions of molding and the like. Examples of the conditions of molding, in injection molding, include pressure conditions such as back pressure and holding pressure, time conditions such as injection time and pressure holding time, and temperature conditions such as cylinder temperature and mold temperature. An increase in the pressure conditions such as back pressure allows for an increase in the shearing force within a cylinder, thereby enabling to shorten the average fiber length of the organic fibers (B). Shortening the injection time also allows for an increase in the shearing force during the injection, thereby enabling to shorten the average fiber length of the organic fibers (B). Further, a decrease in the temperature conditions such as cylinder temperature and metal mold temperature allows for an increase in the viscosity of the flowing resin and thus an increase in the shearing force, thereby enabling to shorten the average fiber length of the organic fibers (B). By varying the conditions as appropriate and as described above, it is possible to adjust the average fiber length of the organic fibers (B) in the molded article within a desired range.

The organic fibers (B) in the molded article have a number average fiber diameter ($d_B$) of 35 to 300 μm (35 μm or more and 300 μm or less). When the organic fibers (B) having a number average fiber diameter ($d_B$) of less than 35 μm are used, larger number of organic fibers are allowed to be present in the resulting molded article, as compared to using the same weight of the organic fibers having a number average fiber diameter ($d_B$) of 35 μm or more. Consequently, it is difficult to inhibit entanglement of organic fibers with each other, resulting in a failure to improve the surface appearance of the molded article. Therefore, the organic fibers (B) preferably have a number average fiber diameter ($d_B$) of 50 μm or more, more preferably 80 μm or more. When the organic fibers (B) have a number average fiber diameter ($d_B$) of more than 300 μm, on the other hand, the organic fibers are likely to cause noticeable surface asperity of the molded article, causing a poor surface appearance, as a result. Thus, the organic fibers (B) preferably have a number average fiber diameter ($d_B$) of 150 μm or less.

The "number average fiber diameter" of the organic fibers (B) refers to an average fiber diameter calculated according to the following equation.

$$\text{Number average fiber diameter} = \Sigma(di \times Ni)/(Ni)$$

di: fiber diameter (μm)
Ni: number of organic fibers having a fiber diameter di

The number average fiber diameter can be measured by the following method. A molded article is heated on a hot stage set at 300° C. in a state sandwiched between glass plates, to form a film in which fibers are uniformly dispersed. The film in which organic fibers are uniformly dispersed is observed under a light microscope (at 200 to 1,000×). The fiber diameters of randomly selected 10 organic fibers (B) are measured, and the number average fiber diameter is calculated according to the above equation. The fiber diameter of an organic fiber as used herein refers to, as shown in FIG. 4, the shortest distance (6) between the arbitrary point B on the fiber contour A (4) and the fiber contour A' (5) opposite to the fiber contour A (4), in each organic fiber (B) to be observed. A number average value obtained by: measuring the fiber diameter at randomly selected 20 locations per one piece of organic fiber (B); and calculating the average of the measured values at the total 200 locations, is defined as the number average fiber diameter. When the number of the organic fibers (B) present within an observation area is less than 10 pieces, the observation area is moved as appropriate to a new area in which 10 pieces of the organic fibers (B) can be observed.

Since the fiber diameter of an organic fiber basically does not change before and after the molding process, it is possible to adjust the fiber diameters of the organic fibers in the molded article, by selecting, as the organic fibers to be used in a molding material, organic fibers having a desired fiber diameter from among organic fibers having various fiber diameters.

Further, the organic fibers (B) in the molded article preferably have an aspect ratio ($L_B$ [μm]/$d_B$ [μm]) of 5 to 100 (5 or more and 100 or less). Examples of means of adjusting the aspect ratio in the above range include balancing the average fiber length and the number average fiber diameter. When the aspect ratio of the organic fibers (B) is adjusted to 5 or more, the load applied upon impact can be transmitted to the organic fibers, thereby further improving the impact strength of the molded article. Examples of means of adjusting the aspect ratio to 5 or more include enlarging the average fiber length $L_B$ moderately and reducing the number average fiber diameter $d_B$ moderately. The aspect ratio is more preferably 10 or more and further preferably 20 or more. On the other hand, when the aspect ratio is adjusted to 100 or less, it is possible to inhibit generating the surface asperity of the molded article due to the organic fibers (B), and a further improved surface appearance can be achieved. Examples of means of adjusting the aspect ratio to 100 or less include reducing the average fiber length $L_B$ moderately and enlarging the number average fiber diameter $d_B$ moderately. The aspect ratio is more preferably 70 or less. The aspect ratio ($L_B/d_B$) as used herein is calculated using the average fiber length $L_B$ and the number average fiber diameter $d_B$ described above.

The aspect ratio of the organic fibers (B) in the molded article can be adjusted within the above described range, for example, by adjusting the average fiber length $L_B$ and the number average fiber diameter $d_B$ of the organic fibers (B) in the molded article within the above described preferred ranges.

Further, the ratio ($n_B/n_A$) of a calculated number $n_B$ of the organic fibers (B) to a calculated number $n_A$ of the carbon fibers (A) in the molded article is preferably 0.001 to 0.01 (0.001 or more and 0.01 or less). The calculated number of fibers as used herein is an indicator of the number of the carbon fibers or the organic fibers included in 1 g of molded article, and is a numerical value calculated from the number average fiber diameter d (μm), average fiber length L (mm), fiber content w (% by mass), and specific gravity ρ (g/cm$^3$), of each type of fibers, according to the following equation.

$$\text{Calculated number of fibers} = ((1 \times w/100)/((d/2)^2 \times \pi L \times \rho)) \times 10^9$$

π: circular constant

When the ratio ($n_B/n_A$) of the calculated number of the organic fibers (B) to that of the carbon fibers (A) is 0.001 or more, it means that the organic fibers (B) contributing to an improvement in impact resistance are included in a number of 0.1% or more of the number of the carbon fibers (A). Since the carbon fibers (A) are rigid and brittle, they are less prone to entanglement but susceptible to breakage. Thus, it is possible to further improve the impact strength of the molded article, by allowing the organic fibers (B), which are flexible and less susceptible to breakage, to be present in the molded article in a number of 0.1% or more of the number of the carbon fibers (A). The ratio ($n_B/n_A$) of the calculated number is more preferably 0.003 or more. Further, when the ratio ($n_B/n_A$) of the calculated number is 0.01 or less, the number of the organic fibers (B) can be adjusted to the extent dispersing each organic fiber (B) easily, and the surface appearance of the molded article can be improved. The ratio ($n_B/n_A$) of the calculated number is more preferably 0.008 or less.

The specific gravity of the carbon fibers (A) or the organic fibers (B) can be measured by retrieving some of the carbon fibers (A) or the organic fibers (B) from the molded article, and carrying out the measurement by a liquid immersion method. Specifically, the specific gravity can be determined by performing the measurement of 0.5 g of the carbon fibers (A) or the organic fibers (B) 3 times, using distilled water as a liquid to be used in the liquid immersion method, and calculating the average value of the measured values. To retrieve the carbon fibers (A) from the molded article, a method can be used in which the organic fibers (B) and the matrix resin are removed by heating at a specific temperature so that the carbon fibers (A) alone remains, or in which the molded article is dissolved in a solvent capable of dissolving the matrix resin and the organic fibers so that the remaining carbon fibers (A) can be retrieved. To retrieve the organic fibers from the molded article, a method can be used in which the difference in specific gravity between the carbon fibers (A) and the organic fibers (B) are utilized. In this method, the molded article is dissolved in a solvent capable of dissolving the matrix resin alone to retrieve the carbon fibers (A) and the organic fibers (B). The retrieved fibers are then introduced, for example, in a solvent having a specific gravity higher than that of the organic fibers (B) and lower than that of the carbon fibers (A) so that the organic fibers (B) alone will float in the solvent, thereby enabling to retrieve the organic fibers (B).

The ratio of calculated number of fibers can be adjusted within the above range, for example, by adjusting the number average fiber diameter and the average fiber length of the organic fibers in the molded article within the above described preferred ranges, or by adjusting the amounts of the carbon fibers (A) and the organic fibers (B) within the above described preferred ranges.

The molded article contains the thermoplastic resin (C) in an amount of 10 to 94 parts by weight (10 parts by weight or more and 94 parts by weight or less) based on 100 parts by weight of the total amount of the carbon fibers (A), the organic fibers (B) and the thermoplastic resin (C). When the content of the thermoplastic resin (C) is less than 10 parts by weight, the dispersibility of the fibers is decreased, resulting in a reduced impact strength. The content of the thermoplastic resin (C) is preferably 20 parts by weight or more, and more preferably 30 parts by weight or more. When the content of the thermoplastic resin (C) is more than 94 parts by weight, on the other hand, the relative contents of the carbon fibers (A) and the organic fibers (B) are reduced, resulting in a decrease in the reinforcing effect provided by the fibers, and thus, in a decrease in the impact strength. The content of the thermoplastic resin (C) is preferably 85 parts by weight or less, and more preferably 75 parts by weight or less.

The thermoplastic resin (C) preferably has a molding temperature (melting temperature) of 200 to 450° C. Examples of the thermoplastic resin (C) include polyolefin resins, polystyrene resins, polyamide resins, vinyl halide resins, polyacetal resins, saturated polyester resins, polycarbonate resins, polyarylsulfone resins, polyarylketone resins, polyarylene ether resins, polyarylene sulfide resins, polyaryl ether ketone resins, polyethersulfone resins, polyarylene sulfide sulfone resins, polyarylate resins, liquid crystal polyester resins, and fluororesins. All of these resins act as an electrical insulator. These may be used in combination of two or more. Further, terminal groups in these resins may be blocked or modified.

Among the thermoplastic resins (C) described above, more preferred are polyolefin resins, polyamide resins, and polycarbonate resins, which are lightweight and excellent in balance between mechanical properties and moldability, and still more preferred are polypropylene resins which are excellent also in chemical resistance and hygroscopicity.

The polypropylene resins may be unmodified or modified.

Specific examples of unmodified polypropylene resins include propylene homopolymer, and copolymers of propylene and at least one monomer selected from the group consisting of α-olefins, conjugated dienes, non-conjugated dienes and other thermoplastic monomers. Examples of the copolymers include random copolymers and block copolymers. Examples of α-olefins include $C_2$-$C_{12}$ α-olefins excluding propylene such as ethylene, 1-butene, 3-methyl-1-butene, 4-methyl-1-pentene, 3-methyl-1-pentene, 4-methyl-1-hexene, 4,4-dimethyl-1-hexene, 1-nonene, 1-octene, 1-heptene, 1-hexene, 1-decene, 1-undecene, and 1-dodecene. Examples of conjugated dienes and unconjugated dienes include butadiene, ethylidene norbornene, dicyclopentadiene, and 1,5-hexadiene. These may be used in combination of two or more. Preferred examples include polypropylene, ethylene-propylene copolymers, propylene-1-butene copolymers, and ethylene-propylene-1-butene copolymers. Propylene homopolymer is preferred from the standpoint of further improving the rigidity of the molded article. A random copolymer or a block copolymer of propylene and an α-olefin, a conjugated diene, a non-conjugated diene and/or the like is preferred from the standpoint of further improving the impact strength of the molded article.

The modified polypropylene resin is preferably an acid-modified polypropylene resin, and more preferably an acid-modified polypropylene resin having a carboxylic acid and/or carboxylate group bound to a polymer chain. The above-described acid-modified polypropylene resin can be obtained by various methods. For example, the acid-modified polypropylene resin can be obtained by the graft polymerization of an unmodified polypropylene resin with a monomer having a carboxylic acid group that is neutralized or not neutralized, and/or a monomer having a carboxylic acid ester group that is saponificated or not saponificated.

Examples of the monomer having a carboxylic acid group that is neutralized or not neutralized and the monomer having a carboxylic acid ester group that is saponificated or not saponificated include ethylenically unsaturated carboxylic acids, anhydrides thereof, and esters of ethylenically unsaturated carboxylic acids.

Examples of ethylenically unsaturated carboxylic acids include (meth)acrylic acid, maleic acid, fumaric acid, tetrahydrophthalic acid, itaconic acid, citraconic acid, crotonic acid, and isocrotonic acid. Examples of anhydrides thereof include nadic acid TM (endocis-bicyclo[2,2,1]hept-5-ene-2,3-dicarboxylic acid), maleic anhydride, and citraconic anhydride.

Examples of esters of ethylenically unsaturated carboxylic acids include (meth)acrylic acid esters such as methyl (meth)acrylate, ethyl (meth)acrylate, propyl (meth)acrylate, n-butyl (meth)acrylate, iso-butyl (meth)acrylate, tert-butyl (meth)acrylate, n-amyl (meth)acrylate, isoamyl (meth)acrylate, n-hexyl (meth)acrylate, 2-ethylhexyl (meth)acrylate, octyl (meth)acrylate, decyl (meth)acrylate, dodecyl (meth)acrylate, octadecyl (meth)acrylate, stearyl (meth)acrylate, tridecyl (meth)acrylate, lauroyl (meth)acrylate, cyclohexyl (meth)acrylate, benzyl (meth)acrylate, phenyl (meth)acrylate, isobornyl (meth)acrylate, dicyclopentanyl (meth)acrylate, dicyclopentenyl (meth)acrylate, dimethylaminoethyl (meth)acrylate, and diethylaminoethyl (meth)acrylate; hydroxyl group-containing (meth)acrylic acid esters such as hydroxyethyl acrylate, 2-hydroxyethyl (meth)acrylate, 2-hydroxypropyl (meth)acrylate, 4-hydroxybutyl acrylate, lactone-modified hydroxyethyl (meth)acrylate, and 2-hydroxy-3-phenoxypropyl acrylate; epoxy group-containing (meth)acrylic acid esters such as glycidyl (meth)acrylate and methyl glycidyl (meth)acrylate; and aminoalkyl (meth)acrylates such as N,N-dimethylaminoethyl (meth)acrylate, N,N-diethylaminoethyl (meth)acrylate, N,N-dimethylaminopropyl (meth)acrylate, N,N-dipropylaminoethyl (meth)acrylate, N,N-dibutylaminoethyl (meth)acrylate, and N,N-dihydroxyethylaminoethyl (meth)acrylate.

These may be used in combination of two or more. Among these, anhydrides of ethylenically unsaturated carboxylic acids are preferred, and maleic anhydride is more preferred.

To improve the flexural strength and the tensile strength of the molded article, it is preferable to use both an unmodified polypropylene resin and a modified polypropylene resin. Particularly, in terms of the balance between the flame retardancy and the mechanical properties, it is preferable to use these resins in such amounts that the weight ratio of the unmodified polypropylene resin to the modified polypropylene resin is 95/5 to 75/25. The weight ratio is more preferably 95/5 to 80/20, and still more preferably 90/10 to 80/20.

The polyamide resins are resins produced using amino acids, lactams, or diamines and dicarboxylic acids as main materials. Typical examples of the main materials include amino acids such as 6-aminocaproic acid, 11-aminoundecanoic acid, 12-aminododecanoic acid, and p-aminomethyl benzoic acid; lactams such as ε-caprolactam and ω-laurolactam; aliphatic diamines such as tetramethylenediamine, hexamethylenediamine, 2-methylpentamethylenediamine, nonamethylenediamine, undecamethylenediamine, dodecamethylenediamine, 2,2,4-/2,4,4-trimethylhexamethylenediamine, and 5-methylnonamethylenediamine; aromatic diamines such as m-xylylenediamine and p-xylylenediamine; alicyclic diamines such as 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine; aliphatic dicarboxylic acids such as adipic acid, suberic acid, azelaic acid, sebacic acid, and dodecanedioic acid; aromatic dicarboxylic acids such as terephthalic acid, isophthalic acid, 2-chloroterephthalic acid, 2-methylterephthalic acid, 5-methylisophthalic acid, 5-sodium sulfoisophthalic acid, hexahydroterephthalic acid, and hexahydroisophthalic acid; and alicyclic dicarboxylic acids such as 1,4-cyclohexanedicarboxylic acid, 1,3-cyclohexanedicarboxylic acid, and 1,2-cyclohexanedicarboxylic acid. These may be used in combination of two or more.

Polyamide resins having a melting point of 200° C. or higher, which are excellent in heat resistance and strength, are particularly useful. Specific examples thereof include polycaproamide (nylon 6), polyhexamethylene adipamide (nylon 66), polycaproamide/polyhexamethylene adipamide copolymer (nylon 6/66), polytetramethylene adipamide (nylon 46), polyhexamethylene sebacamide (nylon 610), polyhexamethylene dodecamide (nylon 612), polyhexamethylene terephthalamide/polycaproamide copolymer (nylon 6T/6), polyhexamethylene adipamide/polyhexamethylene terephthalamide copolymer (nylon 66/6T), polyhexamethylene adipamide/polyhexamethylene isophthalamide copolymer (nylon 66/6I), polyhexamethylene adipamide/polyhexamethylene terephthalamide/polyhexamethylene isophthalamide copolymer (nylon 66/6T/6I), polyhexamethylene terephthalamide/polyhexamethylene isophthalamide copolymer (nylon 6T/6I), polyhexamethylene terephthalamide/polydodecane amide copolymer (nylon 6T/12), polyhexamethylene terephthalamide/poly(2-methylpentamethylene) terephthalamide copolymer (nylon 6T/M5T), polyxylylene adipamide (nylon XD6), polynonamethylene terephthalamide (nylon 9T), and copolymers thereof. These may be used in combination of two or more. Among these, nylon 6 and nylon 66 are more preferred.

The degree of polymerization of the polyamide resins is not particularly limited. However, preferred are polyamide resins having a relative viscosity, as measured at 25° C. in a solution of 0.25 g of polyamide resin in 25 mL of 98% concentrated sulfuric acid of 1.5 to 5.0, and more preferably 2.0 to 3.5.

The polycarbonate resins are obtained by allowing a dihydric phenol to react with a carbonate precursor. Copolymers obtained using two or more dihydric phenols or two or more carbonate precursors may be used. Examples of the reaction method include interfacial polymerization, melt transesterification, solid phase transesterification of a carbonate prepolymer, and ring-opening polymerization of a cyclic carbonate compound. For example, the polycarbonate resin disclosed in JP 2002-129027 A can be used.

Examples of dihydric phenols include 1,1-bis(4-hydroxyphenyl)-3,3,5-trimethylcyclohexane, bis(4-hydroxyphenyl)alkane (e.g., bisphenol A), 2,2-bis{(4-hydroxy-3-methyl)phenyl}propane, α,α'-bis(4-hydroxyphenyl)-m-diisopropylbenzene, and 9,9-bis(4-hydroxy-3-methylphenyl)fluorene. These may be used in combination of two or more. Among these, preferred is bisphenol A which can provide a polycarbonate resin with higher impact resistance. On the other hand, copolymers obtained using bisphenol A and any other dihydric phenol are excellent in high heat resistance or low water absorption.

Examples of carbonate precursors include carbonyl halides, carbonic acid diesters, and haloformates, and specific examples include phosgene, diphenyl carbonate, and dihaloformates of a dihydric phenol.

In the production of a polycarbonate resin from such a dihydric phenol and a carbonate precursor, any of catalysts, terminal blocking agents, antioxidants for preventing oxidation of the dihydric phenol, and the like may be used, as necessary.

Further, the polycarbonate resin may be: a branched polycarbonate resin obtained by copolymerization of a polyfunctional aromatic compound of trifunctional or higher; a polyester carbonate resin obtained by copolymerization of an aromatic or aliphatic (including alicyclic) difunctional carboxylic acid; a copolymerized polycarbonate resin obtained by copolymerization of a difunctional aliphatic (including alicyclic) alcohol; or a polyester carbonate resin obtained by copolymerization of both of such a difunctional carboxylic acid and a difunctional aliphatic alcohol. These polycarbonate resins may be used in combination of two or more.

The molecular weight of the polycarbonate resin is not particularly limited, but preferably 10,000 to 50,000 in terms of viscosity average molecular weight. A viscosity average molecular weight of 10,000 or more can further improve the strength of the molded article. The viscosity average molecular weight is more preferably 15,000 or more, and still more preferably 18,000 or more. A viscosity average molecular weight of 50,000 or less, on the other hand, improves moldability. The viscosity average molecular weight is more preferably 40,000 or less, and still more preferably 30,000 or less. When two or more polycarbonate resins are used, it is preferred that at least one of the polycarbonate resins have a viscosity average molecular weight within the range described above. In such a case, the other polycarbonate resin(s) preferably has/have a viscosity average molecular weight of more than 50,000, and preferably more than 80,000. Such a polycarbonate resin has a high entropy elasticity, and thus is advantageous when molding such as gas-assisted molding is used in combination, and at the same time, exhibits properties derived from the high entropy elasticity (anti-drip properties, drawdown properties, and properties of improving melt properties such as jetting).

The viscosity average molecular weight (M) of the polycarbonate resin is a value determined by measuring a specific viscosity ($\eta_{sp}$) of a solution of 0.7 g of the polycarbonate resin in 100 mL of methylene chloride, at 20° C., and substituting the specific viscosity ($\eta_{sp}$) into the following equation.

$\eta_{sp}/c=[\eta]+0.45\times[\eta]^2$ (where [η] is a limiting viscosity)

$[\eta]=1.23\times10^{-4}\times M^{0.83}$ c=0.7

The molded article preferably includes a compound (D) having a melt viscosity at 200° C. that is lower than that of the thermoplastic resin (C), in addition to the carbon fibers (A), the organic fibers (B), and the thermoplastic resin (C). The melt viscosity at 200° C. of the compound (D) having a melt viscosity at 200° C. that is lower than that of the thermoplastic resin (C) (sometimes referred to as "compound (D)") is preferably 5 Pa·s or lower, more preferably 2 Pa·s or lower, and still more preferably 1.5 Pa·s or lower. Adjusting the melt viscosity at 200° C. within this range allows for a further improvement in the dispersibility of the carbon fibers (A) and the organic fibers (B) during the molding, as well as a further improvement in the flexural strength and the tensile strength of the resulting molded article. The melt viscosity at 200° C. of the thermoplastic resin (C) and the compound (D) can be measured with a viscoelasticity meter at 0.5 Hz using a 40-mm parallel plate.

The molded article can be obtained by using the molding material to be described later. In the production of the molding material, a roving of carbon fibers (A), a roving of organic fibers (B), or a fiber bundle (E) including the carbon fibers (A) and organic fibers (B) is prepared first, as will be described later. Subsequently, the roving of the carbon fibers (A), the roving of the organic fibers (B), or the fiber bundle (E) is impregnated with a molten compound (D), to produce a composite (G), (J), or (F), respectively. At this time, since the compound (D) is preferably supplied at a melting temperature (temperature in the melting bath) of 100 to 300° C., we paid attention to the melt viscosity at 200° C. of the compound (D) as an indicator of the impregnation of the compound (D) into the roving of the carbon fibers (A), the roving of the organic fibers (B), or the fiber bundle (E). When the melt viscosity at 200° C. is within the above described preferred range, the compound (D) exhibits excellent impregnation, within the above described preferred range of the melting temperature. As a result, the dispersibility of the carbon fibers (A) and the organic fibers (B) is further improved, thereby enabling to further improve the impact strength of the molded article.

The compound (D) may be, for example, a compound having a number average molecular weight of 200 to 50,000. The compound having a number average molecular weight of 200 to 50,000 is typically a solid that is relatively brittle and easily broken, or a liquid, at normal temperature. Such a compound, due to its low molecular weight, is highly flowable, and can enhance the dispersion of the carbon fibers (A) and the organic fibers (B) in the thermoplastic resin (C). In other words, when the compound (D) has a number average molecular weight of 200 or more, it is possible to further improve the mechanical properties, particularly, the flexural strength and tensile strength, of the molded article. The number average molecular weight is more preferably 1,000 or more. When the compound (D) has a number average molecular weight of 50,000 or less, on the other hand, the compound has an adequately low viscosity, and thus exhibits excellent impregnation into the carbon fibers (A) and the organic fibers (B) contained in the molded article. As a result, the dispersibility of the carbon fibers (A) and the organic fibers (B) in the molded article can further be improved. The number average molecular weight is more preferably 3,000 or less. The number average molecular weight of such a compound can be determined using gel permeation chromatography (GPC).

The compound (D) preferably has a high affinity to the thermoplastic resin (C). Selecting a compound (D) having a high affinity to the thermoplastic resin (C) facilitates the compatibility of the compound (D) with the thermoplastic resin (C), as a result of which the dispersibility of the carbon fibers (A) and the organic fibers (B) can further be improved.

The compound (D) is selected as appropriate depending on the combination with the thermoplastic resin (C), which is a matrix resin. For example, when the molding temperature is 150° C. to 270° C., a terpene resin is suitably used, and when the molding temperature is 270° C. to 320° C., an epoxy resin is suitably used. Specifically, when the thermoplastic resin (C) is a polypropylene resin, the compound (D) is preferably a terpene resin. When the thermoplastic resin (C) is a polycarbonate resin, the compound (D) is preferably an epoxy resin. When the thermoplastic resin (C) is a polyamide resin, the compound (D) is preferably a terpene phenol resin.

The content of the compound (D) in the molded article is preferably 1 to 25 parts by weight (1 part by weight or more and 25 parts by weight or less) based on 100 parts by weight of the total amount of the carbon fibers (A), the organic fibers (B), and the thermoplastic resin (C). When the content of the compound (D) is 1 part by weight or more, the flowability of the carbon fibers (A) and the organic fibers (B) in the molded article is further improved, resulting in a further improvement in the dispersibility. The content is more preferably 2 parts by weight or more, and still more preferably 4 parts by weight or more. When the content of the compound (D) is 25 parts by weight or less, on the other hand, the flexural strength, tensile strength, and impact strength of the molded article can further be improved. The content is more preferably 20 parts by weight or less, and still more preferably 15 parts by weight or less.

The compound (D) preferably shows a weight loss on heating at the molding temperature, as measured at a heating rate of 10° C./min (in air), of 5% by weight or less. When the weight loss on heating is 5% by weight or less, generation of decomposition gas can be reduced during impregnation of the carbon fibers (A) and the organic fibers (B) with the compound (D), allowing for a reduction in void formation during the molding process. The gas generation can be reduced particularly in high-temperature molding. The weight loss on heating is more preferably 3% by weight or less.

The weight loss on heating at the molding temperature of the compound (D) as used herein refers to a weight reduction ratio of the weight of the compound (D) after heating under the above described heating condition, with respect to the weight of the compound (D) before the heating, which is taken as 100%. The above descried weight loss on heating can be determined according to the following equation. The weights of the compound (D) before and after heating can be determined by measuring the weights thereof before and after the heating at the molding temperature by thermogravimetric analysis (TGA) using a platinum sample pan in an air atmosphere at a heating rate of 10° C./min.

Weight loss on heating [% by weight]={(weight before heating−weight after heating)/weight before heating}×100

The epoxy resin suitably used as the compound (D) refers to a compound having two or more epoxy groups, wherein the compound includes substantially no curing agent, and does not undergo curing due to so-called three-dimensional cross-linking even under heating. The compound (D) preferably has a glycidyl group, which facilitates interaction with the carbon fibers (A) and the organic fibers (B), compatibility with a fiber bundle (E), and impregnation. Further, dispersibility of the carbon fibers (A) and the organic fibers (B) during molding further improves.

Examples of the compound having a glycidyl group include glycidyl ether epoxy resins, glycidyl ester epoxy resins, glycidyl amine epoxy resins, and alicyclic epoxy resins. These may be used in combination of two or more.

Examples of glycidyl ether epoxy resins include bisphenol A epoxy resins, bisphenol F epoxy resins, bisphenol AD epoxy resins, halogenated bisphenol A epoxy resins, bisphenol S epoxy resins, resorcinol epoxy resins, hydrogenated bisphenol A epoxy resins, phenol novolac epoxy resins, cresol novolac epoxy resins, aliphatic epoxy resins having an ether bond, naphthalene epoxy resins, biphenyl epoxy resins, biphenyl aralkyl epoxy resins, and dicyclopentadiene epoxy resins.

Examples of glycidyl ester epoxy resins include hexahydrophthalic acid glycidyl ester and dimer acid diglycidyl ester.

Examples of glycidyl amine epoxy resins include triglycidyl isocyanurate, tetraglycidyl diaminodiphenylmethane, tetraglycidyl m-xylenediamine, and aminophenol epoxy resins.

Examples of alicyclic epoxy resins include 3,4-epoxy-6-methyl cyclohexylmethyl carboxylate and 3,4-epoxycyclohexylmethyl carboxylate.

Above all, in terms of excellent balance between viscosity and heat resistance, glycidyl ether epoxy resins are preferred, and bisphenol A epoxy resins and bisphenol F epoxy resins are more preferred.

The number average molecular weight of the epoxy resin used as the compound (D) is preferably 200 to 5,000. When the number average molecular weight of the epoxy resin is 200 or more, the mechanical properties of the molded article can further be improved. The number average molecular weight of the epoxy resin is more preferably 800 or more, and still more preferably 1,000 or more. When the number average molecular weight of the epoxy resin is 5,000 or less, on the other hand, excellent impregnation into the fiber bundle (E) is exhibited, and the dispersibility of the carbon fibers (A) and the organic fibers (B) can further be improved. The number average molecular weight of the epoxy resin is more preferably 4,000 or less, and still more preferably 3,000 or less. The number average molecular weight of the epoxy resin can be determined using gel permeation chromatography (GPC).

Examples of terpene resins include polymers and copolymers obtained by polymerization of terpene monomers, optionally with aromatic monomers, in an organic solvent in the presence of a Friedel-Crafts catalyst.

Examples of terpene monomers include monocyclic monoterpenes such as α-pinene, β-pinene, dipentene, d-limonene, myrcene, allo-ocimene, ocimene, α-phellandrene, α-terpinene, γ-terpinene, terpinolene, 1,8-cineol, 1,4-cineol, α-terpineol, α-terpineol, γ-terpineol, sabinene, p-menthadienes, and carenes. Examples of aromatic monomers include styrene and α-methyl styrene.

Among these, α-pinene, β-pinene, dipentene, and d-limonene, which have high compatibility with the thermoplastic resin (C), are preferred, and homopolymers of these terpene monomers are more preferred. Further, hydrogenated terpene resins obtained by hydrogenation of these terpene resins are preferred, since they have an even higher compatibility with the thermoplastic resin (C), particularly, with a polypropylene resin.

The glass transition temperature of the terpene resin is preferably 30 to 100° C., but not particularly limited thereto. A glass transition temperature of 30° C. or higher facilitates the handling of the compound (D) during molding. A glass transition temperature of 100° C. or lower makes it possible to moderately control the compound (D) during molding, leading to improved moldability.

The number average molecular weight of the terpene resin is preferably 200 to 5,000. When the number average molecular weight is 200 or more, the mechanical properties, particularly, the flexural strength and tensile strength of the molded article can further be improved. When the number average molecular weight is 5,000 or less, on the other hand, the terpene resin has an adequately low viscosity, and thus exhibits excellent impregnation. As a result, dispersibility of the carbon fibers (A) and the organic fibers (B) in the molded article can further be improved. The number average molecular weight of the terpene resin can be determined using gel permeation chromatography (GPC).

The terpene phenol resin is obtained by allowing a terpene monomer to react with a phenol, using a catalyst. A preferred phenol is one having on its benzene ring 1 to 3 groups selected from the group consisting of alkyl groups, halogen atoms and hydroxyl groups. Specific examples thereof include cresol, xylenol, ethylphenol, butylphenol, t-butylphenol, nonylphenol, 3,4,5-trimethylphenol, chlorophenol, bromophenol, chlorocresol, hydroquinone, resorcinol, and orcinol. These may be used in combination of two or more. Among these, phenol and cresol are preferred.

The number average molecular weight of the terpene phenol resin is preferably 200 to 5,000. When the number average molecular weight is 200 or more, the flexural strength and tensile strength of the molded article can further be improved. When the number average molecular weight is 5,000 or less, on the other hand, the terpene phenol resin has an adequately low viscosity, and thus exhibits excellent impregnation. As a result, dispersibility of the carbon fibers (A) and the organic fibers (B) in the molded article can further be improved. The number average molecular weight of the terpene phenol resin can be determined using gel permeation chromatography (GPC).

The molded article may contain other components in addition to the above described components (A) to (D), to the extent that the desired effect is not impaired. Examples of other components include thermosetting resins, inorganic fillers other than carbon fibers, flame retardants, conductivity-imparting agents, crystal nucleating agents, UV absorbers, antioxidants, vibration dampers, antimicrobial agents, insect repellents, deodorizers, stain inhibitors, heat stabilizers, mold releasing agents, antistatic agents, plasticizers, lubricants, coloring agents, pigments, dyes, foaming agents, foam suppressors, and coupling agents.

A method of producing the molded article will now be described.

The molded article can be obtained preferably by molding the molding material to be described later. Examples of molding methods include injection molding, autoclave molding, press molding, filament winding molding, and stamping molding, which are excellent in productivity. These may be used in combination of two or more. An integrated molding method such as insert molding or outsert molding can also be used. Further, it is also possible to perform, after the molding process, a correction treatment by heating, or a bonding technique excellent in productivity such as heat welding, vibration welding, or ultrasonic welding. Among these, preferred is a molding method using a mold. In particular, a molding method using an injection molding machine allows for producing molded articles continuously and stably. The conditions of injection molding are not particularly limited, and preferred conditions are, for example, as follows: injection time: 0.5 seconds to 10 seconds, more preferably 2 seconds to 10 seconds; back pressure: 0.1 MPa to 10 MPa, more preferably 2 MPa to 8 MPa; holding pressure: 1 MPa to 50 MPa, more preferably 1 MPa to 30 MPa; pressure holding time: 1 second to 20 seconds, more preferably 5 seconds to 20 seconds; cylinder temperature: 200° C. to 320° C.; and mold temperature: 20° C. to 100° C. The cylinder temperature as used herein refers to the temperature of a portion used to heat and melt a molding material in the injection molding machine, and the mold temperature refers to the temperature of a mold into which a resin is injected to be formed into a desired shape.

By appropriately selecting these conditions, particularly, the injection time, back pressure, and mold temperature, the length of reinforcement fibers in the resulting molded article can be easily adjusted.

The fiber reinforced thermoplastic resin molding material (sometimes referred to as "molding material") that is suitable to produce the molded article will now be described. (1) A fiber reinforced thermoplastic resin molding material (hereinafter sometimes referred to as "molding material according to a first example"), or (2) a molding material (hereinafter sometimes referred to as "molding material according to a second example") can be suitably used as a molding material to produce the molded article. The molding material according to the first example comprises 5 to 45 parts by weight (5 parts by weight or more and 45 parts by weight or less) of carbon fibers (A), 1 to 45 parts by weight (1 part by weight or more and 45 parts by weight or less) of organic fibers (B), 10 to 94 parts by weight (10 parts by weight or more and 94 parts by weight or less) of a thermoplastic resin (C), and 1 to 25 parts by weight (1 part by weight or more and 25 parts by weight or less) of a compound (D) having a melt viscosity at 200° C. that is lower than that of the thermoplastic resin (C), based on 100 parts by weight of the total amount of the carbon fibers (A), the organic fibers (B), and the thermoplastic resin (C), wherein: the organic fibers (B) have a number average fiber diameter ($d_B$) of 35 to 300 μm (35 μm or more and 300 μm or less); the thermoplastic resin (C) is contained at the outer side of a composite (F) obtained by impregnating a fiber bundle (E) comprising the carbon fibers (A) and the organic fibers (B) with the compound (D); the carbon fibers (A) and the organic fibers (B) are unevenly distributed in a cross section of the fiber bundle (E); and the length of the fiber bundle (E) and the length of the fiber reinforced thermoplastic resin molding material are substantially the same. The molding material according to the second example comprises: a carbon fiber reinforced thermoplastic resin molding material (X) comprising 5 to 45 parts by weight (5 parts by weight or more and 45 parts by weight or less) of carbon fibers (A), 35 to 94 parts by weight (35 parts by weight or more and 94 parts by weight or less) of a thermoplastic resin (C), and 1 to 25 parts by weight (1 part by weight or more and 25 parts by weight or less) of a compound (D) having a melt viscosity at 200° C. that is lower than that of the thermoplastic resin (C), based on 100 parts by weight of the total amount of the carbon fibers (A), the thermoplastic resin (C), and the compound (D) having a melt viscosity at 200° C. that is lower than that of the thermoplastic resin (C), wherein the thermoplastic resin (C) is contained at the outer side of a composite (G) obtained by impregnating the carbon fibers (A) with the compound (D), and the length of the carbon fibers (A) and the length of the carbon fiber reinforced thermoplastic resin molding material are substantially the same; and an organic fiber reinforced thermoplastic resin molding material (Y) comprising 1 to 45 parts by weight (1 part by weight or more and 45 parts by weight or less) of organic fibers (B), 35 to 94 parts by weight (35 parts by weight or more and 94 parts by weight or less) of a thermoplastic resin (H), and 1 to 25 parts by weight (1 part by weight or more and 25 parts by weight or less) of a compound (I) having a melt viscosity at 200° C. that is lower than that of the thermoplastic resin (H), based on 100 parts by weight of the total amount of the organic fibers (B), the thermoplastic resin (H), and the compound (I), wherein the organic fibers (B) have a number average fiber diameter ($d_B$) of 35 to 300 μm (35 μm or more and 300 μm or less).

First, the molding material according to the first example will be described. The molding material according to the first example used to produce the molded article described above comprises at least carbon fibers (A), organic fibers (B), a thermoplastic resin (C), and a compound (D), and the organic fibers (B) have a number average fiber diameter ($d_B$) of 35 to 300 μm (35 μm or more and 300 μm or less). Further, the molding material according to the first example has a structure comprising a composite (F) obtained by impregnating a fiber bundle (E) comprising the carbon fibers (A) and the organic fibers (B) with the compound (D), the thermoplastic resin (C) being contained at the outer side of the composite (F). The effects provided by the carbon fibers (A), the organic fibers (B), the thermoplastic resin (C), and the compound (D) are as described above in the description of the molded article.

The molding material according to the first example has the composite (F) in which the carbon fibers (A) and the organic fibers (B) in the form of a continuous fiber bundle are present inside the thermoplastic resin (C), and the gaps between the single fibers of the carbon fibers (A) and the organic fibers (B) are filled with the compound (D). The composite (F) has a structure in which the carbon fibers (A) and the organic fibers (B) are dispersed like islands in a sea of the compound (D).

The molding material according to the first example comprises the thermoplastic resin (C) at the outer side of the composite (F) obtained by impregnating the fiber bundle (E) with the compound (D). A preferred structure is one in which the thermoplastic resin (C) is disposed to surround the composite (F) in a cross section perpendicular to the longer direction of the molding material, or one in which the composite (F) and the thermoplastic resin (C) are disposed in layers, the thermoplastic resin (C) being the outermost layer in a cross section perpendicular to the longer direction of the molding material.

In the molding material according to the first example, the compound (D), in most cases, is a low molecular weight compound, and is typically in the form of a solid that is relatively brittle and easily broken, or a liquid, at normal temperature. The structure in which the thermoplastic resin (C) is contained at the outer side of the composite (F) allows the thermoplastic resin (C) having a high molecular weight to protect the composite (F), to prevent the destruction, scattering and the like of the compound (D) due to impact, abrasion and the like during conveyance and handling of the molding material, and to retain the shape of the molding material. From the standpoint of handleability, the molding material preferably keeps the above-described shape until being subjected to molding.

The composite (F) and the thermoplastic resin (C) may be such that the composite (F) and the thermoplastic resin (C) which has partially penetrated into a portion of the composite (F) at or near their interface are mixing with each other, or that the fiber bundle (E) is impregnated with the thermoplastic resin (C).

Figure 2:
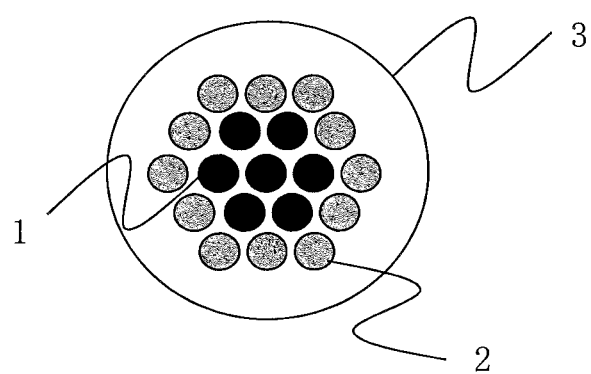
FIG. 2 is a schematic view illustrating a molding material cross section in an example where the organic fibers (B) envelop the carbon fibers (A) in a cross section of the fiber bundle (E).
Figure 3:
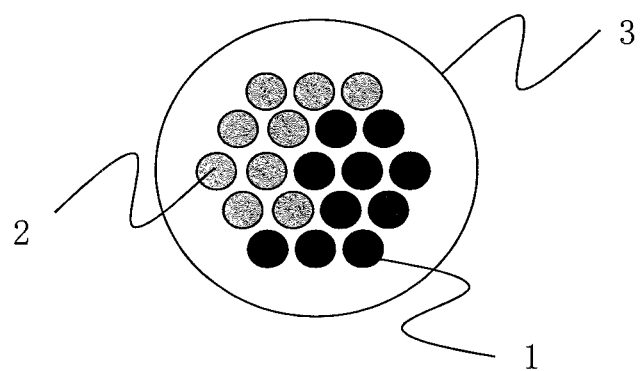
FIG. 3 is a schematic view illustrating a molding material cross section in an example where a bundle of the carbon fibers (A) and a bundle of the organic fibers (B) are present separated by a certain boundary in a cross section of the fiber bundle (E).

In the molding material according to the first example, the carbon fibers (A) and the organic fibers (B) are preferably unevenly distributed in a cross section of the fiber bundle (E). The cross section of the fiber bundle (E) as used herein refers to a cross section of the fiber bundle (E) perpendicular to the longer direction of fiber. When the carbon fibers (A) and the organic fibers (B) are unevenly distributed in a cross section of the fiber bundle (E), the entanglement between the carbon fibers (A) and the organic fibers (B) during molding can be prevented, thereby enabling to produce a molded article in which the carbon fibers (A) and the organic fibers (B) are uniformly dispersed. As a result, the impact strength of the molded article can further be improved. The expression "unevenly distributed" means that, in a cross section of the fiber bundle (E), the carbon fibers (A) and the organic fibers (B) are not uniformly present throughout the entire region, but present unevenly at some parts. Examples in which the fibers are "unevenly distributed" include: so-called core-in-sheath structures such as an example where the carbon fibers (A) envelop the organic fibers (B) in a cross section of the fiber bundle (E), as shown in FIG. 1, and an example where the organic fibers (B) envelop the carbon fibers (A), as shown in FIG. 2; and a structure in which a bundle of the carbon fibers (A) and a bundle of the organic fibers (B) are present separated by a certain boundary in a cross section of the fiber bundle (E), as shown in FIG. 3. The term "envelop" refers to a state in which the carbon fibers (A) are disposed at the core and the organic fibers (B) at the sheath, or a state in which the organic fibers (B) are disposed at the core and the carbon fibers (A) at the sheath. In the example shown in FIG. 3, at least a portion of the carbon fibers (A) and at least a portion of the organic fibers (B) are both in contact with the thermoplastic resin (C) at the outer side, in a cross section of the fiber bundle (E). In this case, examples where the carbon fibers (A) or the organic fibers (B) are in contact with the thermoplastic resin (C) are intended to encompass examples where the carbon fibers (A) or the organic fibers (B) are in contact with the thermoplastic resin (C) via the compound (D).

To confirm that the carbon fibers (A) and the organic fibers (B) are unevenly distributed in a cross section of the fiber bundle (E), for example, a method can be used in which a cross section perpendicular to the longer direction of fiber of the molding material is observed under a light microscope at a magnification of 300×, and the micrograph obtained is subjected to image processing to be analyzed.

To allow the carbon fibers (A) and the organic fibers (B) to be unevenly distributed in a cross section of the fiber bundle (E), a method can be used, for example, in which the molding material is produced in a state where a bundle of the carbon fibers (A) and a bundle of the organic fibers (B) are aligned. When the molding material is produced in a state where the respective bundles are aligned, the carbon fibers (A) and the organic fibers (B) are allowed to exist as separate fiber bundles, thereby enabling the carbon fibers (A) and the organic fibers (B) to be unevenly distributed. Increasing in the number of single fibers in the bundle of the carbon fibers (A) and the bundle of the organic fibers (B) to be used allows for an increase in the size of the bundles, and reducing the number of the single fibers in the bundles allows for a decrease in the size of the bundles. In this manner, it is possible to allow the fibers (A) and (B) to be unevenly distributed while varying the size of the bundles.

In the molding material according to the first example, the length of the fiber bundle (E) is preferably substantially the same as the length of the molding material. When the length of the fiber bundle (E) is substantially the same as the length of the molding material, the resulting molded article can contain the carbon fibers (A) and the organic fibers (B) having a long fiber length, and thus can have more excellent mechanical properties. The length of the molding material refers to a length thereof in the orientation direction of the fiber bundle (E) in the molding material. Further, the expression "substantially the same length" means that the fiber bundle (E) is not cut intentionally in the molding material, or that the fiber bundle (E) significantly shorter than the overall length of the molding material is substantially absent. Although the amount of the fiber bundle (E) shorter than the overall length of the molding material is not limited to a particular value, the content of the fiber bundle (E) having a length that is 50% or less of the overall length of the molding material is preferably 30% by mass or less, and more preferably 20% by mass or less, with respect to the total amount of the fiber bundle (E). The molding material is preferably continuous and has a cross-sectional shape that is substantially the same across the longer direction.

The length of the molding material according to the first example is typically 3 mm to 15 mm.

As the components (A) to (D) of the molding material according to the first example, it is possible to use the components (A) to (D) described above in the section of the molded article. In addition, the other components exemplified for the molded article can be contained.

The molding material according to the first example contains the carbon fibers (A) in an amount of 5 to 45 parts by weight (5 parts by weight or more and 45 parts by weight or less) based on 100 parts by weight of the total amount of the carbon fibers (A), the organic fibers (B), and the thermoplastic resin (C). To further improve the flexural properties and the impact strength of the molded article, the content of the carbon fibers (A) is more preferably 10 parts by weight or more. To improve the dispersibility of the carbon fibers (A) in the molded article and further improve the impact strength of the molded article, the content of the carbon fibers (A) is more preferably 30 parts by weight or less. Further, the molding material according to the first example contains the organic fibers (B) in an amount of 1 to 45 parts by weight (1 part by weight or more and 45 parts by weight or less) based on 100 parts by weight of the total amount of the above described components (A) to (C). To further improve the impact properties of the molded article, the content of the organic fibers (B) is preferably 5 parts by weight or more. To improve the dispersibility of the organic fibers (B) in the molded article and further improve the impact strength of the molded article, the content of the organic fibers (B) is more preferably 30 parts by weight or less. Further, the molding material according to the first example contains the thermoplastic resin (C) in an amount of 10 to 94 parts by weight (10 parts by weight or more and 94 parts by weight or less) based on 100 parts by weight of the total amount of the components (A) to (C). The content of the thermoplastic resin (C) is preferably 20 parts by weight or more, and more preferably 30 parts by weight or more. To further improve the impact strength of the molded article, the content of the thermoplastic resin (C) is preferably 85 parts by weight or less, and more preferably 75 parts by weight or less. Further, the molding material according to the first example contains the compound (D) in an amount of 1 to 25 parts by weight (1 part by weight or more and 25 parts by weight or less) based on 100 parts by weight of the total amount of the components (A) to (C). To improve the flowability and dispersibility of the carbon fibers (A) and the organic fibers (B) during molding, the content of the compound (D) is more preferably 2 parts by weight or more, and still more preferably 4 parts by weight or more. On the other hand, to further improve the flexural strength, tensile strength and impact strength of the molded article, the content of the compound (D) is more preferably 20 parts by weight or less, and still more preferably 15 parts by weight or less.

The organic fibers (B) in the molding material according to the first example have a number average fiber diameter ($d_B$) of 35 to 300 μm (35 μm or more and 300 μm or less). Since the number average fiber diameter ($d_B$) of the organic fibers (B) generally does not change before and after the production process of the molding material, it is possible to easily adjust the number average fiber diameter ($d_B$) of the organic fibers (B) in the molding material within the above described desired range, by adjusting the number average fiber diameter ($d_B$) of the organic fibers (B) as a raw material to 35 to 300 The number average fiber diameter ($d_B$) of the organic fibers (B) in the molding material is more preferably 50 µm or more and 150 µm or less.

The "number average fiber diameter" of the organic fibers (B) refers to an average fiber diameter calculated according to the following equation.

$$\text{Number average fiber diameter} = \Sigma/(di \times Ni)/\Sigma(Ni)$$

di: fiber diameter (µm)
Ni: number of organic fibers having a fiber diameter di

The number average fiber diameter of the organic fibers in the molding material can be determined in the same manner as the number average fiber diameter of the organic fibers in the molded article.

Next, the molding material according to the second example will be described. The molding material according to the second example used to produce the molded article described above comprises a carbon fiber reinforced thermoplastic resin molding material (X) (sometimes referred to as "carbon fiber reinforced molding material") comprising at least carbon fibers (A), a thermoplastic resin (C), and a compound (D) having a melt viscosity at 200° C. that is lower than that of the thermoplastic resin (C); and an organic fiber reinforced thermoplastic resin molding material (Y) (sometimes referred to as "organic fiber reinforced molding material") comprising at least organic fibers (B), a thermoplastic resin (H) and a compound (I) having a melt viscosity at 200° C. that is lower than that of the thermoplastic resin (H) (sometimes referred to as "compound (I)"), wherein the organic fibers (B) have a number average fiber diameter ($d_B$) of 35 to 300 µm (35 µm or more and 300 µm or less). The carbon fiber reinforced molding material (X) preferably has a structure comprising a composite (G) obtained by impregnating the carbon fibers (A) with the compound (D), the thermoplastic resin (C) being contained at the outer side of the composite (G). The organic fiber reinforced molding material (Y) has a structure comprising a composite (J) obtained by impregnating the organic fibers (B) with the compound (I), the thermoplastic resin (H) being contained at the outer side of the composite (J). The effects provided by the carbon fibers (A) and the organic fibers (B) are as described above in the description of the molded article. The thermoplastic resin (C) and the thermoplastic resin (H), which are matrix resins having a relatively high viscosity and excellent physical properties such as toughness, are impregnated into the carbon fibers (A) or the organic fibers (B) during molding to firmly hold the carbon fibers (A) or the organic fibers (B) in the molded article. As the thermoplastic resin (H), any of the resins exemplified for the above described thermoplastic resin (C) can be used, and the thermoplastic resin (C) and the thermoplastic resin (H) may be the same as, or different from, each other. The compound (D) and the compound (I) each form a composite together with the carbon fibers (A) or the organic fibers (B), and facilitate a matrix resin (the thermoplastic resin (C) or (H)) to be impregnated into the carbon fibers (A) or the organic fibers (B) during molding, and facilitate the carbon fibers (A) or the organic fibers (B) to be dispersed in the matrix resin (the thermoplastic resin (C) or (H)). In other words, the compound (D) and the compound (I) serve as a so-called impregnation aid and a dispersion aid. As the compound (D) and the compound (I) may be the same type of compound, each other.

The carbon fiber reinforced molding material (X) has the composite (G) in which the carbon fibers (A) in the form of a continuous fiber bundle are present inside the thermoplastic resin (C), and the gaps between the single fibers of the carbon fibers (A) are filled with the compound (D). The composite (G) preferably has a structure in which the carbon fibers (A) are dispersed like islands in a sea of the compound (D). Likewise, it is preferred that the organic fiber reinforced molding material (Y) have the composite (J) in which the gaps between the single fibers of the organic fibers (B) are filled with the compound (I), and have a structure in which the organic fibers (B) are dispersed like islands in a sea of the compound (I).

The carbon fiber reinforced molding material (X) in the molding material according to the second example preferably comprises the thermoplastic resin (C) at the outer side of the composite (G) obtained by impregnating the carbon fibers (A) with the compound (D). A preferred structure is one in which the thermoplastic resin (C) is disposed to surround the composite (G) in a cross section perpendicular to the longer direction of the carbon fiber reinforced molding material (X), or one in which the composite (G) and the thermoplastic resin (C) are disposed in layers, the thermoplastic resin (C) being the outermost layer in a cross section perpendicular to the longer direction of the molding material. Likewise, it is preferred that the organic fiber reinforced molding material (Y) comprise the thermoplastic resin (H) at the outer side of the composite (J) obtained by impregnating the organic fibers (B) with the compound (I). A preferred structure is one in which the thermoplastic resin (H) is disposed to surround the composite (J) in a cross section perpendicular to the longer direction of the organic fiber reinforced molding material (Y), or one in which the composite (J) and the thermoplastic resin (H) are disposed in layers, the thermoplastic resin (H) being the outermost layer in a cross section perpendicular to the longer direction of the molding material.

In the molding material according to the second example, the compound (D) and the compound (I), in most cases, are low molecular weight compounds, and are typically in the form of a solid that is relatively brittle and easily broken, or a liquid, at normal temperature. In the carbon fiber reinforced molding material (X) or the organic fiber reinforced molding material (Y), the structure in which the thermoplastic resin (C) or (H) is contained at the outer side of the composite (G) or the composite (J) allows the thermoplastic resin (C) or (H) having a high molecular weight to protect the composite (G) or the composite (J), to prevent the destruction, scattering and the like of the compound (D) or (I) due to impact, abrasion and the like during conveyance and handling of the molding material, and to retain the shape of the molding material. The molding material according to the second example preferably keeps the above-described shape until being subjected to molding.

In the carbon fiber reinforced molding material (X), the composite (G) and the thermoplastic resin (C) may be such that the composite (G) and the thermoplastic resin (C) which has partially penetrated into a portion of the composite (G) at or near their interface are mixing with each other, or that the carbon fibers (A) are impregnated with the thermoplastic resin (C). And in the organic fiber reinforced molding material (Y), the composite (J) and the thermoplastic resin (H) may be such that the composite (J) and the thermoplastic resin (H) which has partially penetrated into a portion of the composite (J) at or near their interface are mixing with each other, or that the organic fibers (B) are impregnated with the thermoplastic resin (H).

The carbon fibers (A) in the carbon fiber reinforced molding material (X) preferably have a length that is substantially the same as the length of the carbon fiber reinforced molding material (X). When the length of the carbon fibers (A) is substantially the same as the length of the carbon fiber reinforced molding material (X), the resulting molded article can contain the carbon fibers (A) having a long fiber length, and thus can have excellent mechanical properties. The length of the carbon fiber reinforced molding material (X) refers to a length thereof in the orientation direction of the carbon fibers (A) in the carbon fiber reinforced molding material. Further, the expression "substantially the same length" means that the carbon fibers (A) are not cut intentionally in the molding material, or that the carbon fibers (A) significantly shorter than the overall length of the molding material are substantially absent. Although the amount of the carbon fibers (A) shorter than the overall length of the molding material is not limited to a particular value, the content of the carbon fibers (A) having a length that is 50% or less of the overall length of the molding material is preferably 30% by mass or less, and more preferably 20% by mass or less, with respect to the total amount of the carbon fibers (A). The molding material is preferably, but not necessarily, continuous and has a cross-sectional shape that is substantially the same across the longer direction. The length of the carbon fiber reinforced molding material (X) is typically 3 mm to 15 mm.

The organic fiber reinforced molding material (Y) comprises the organic fibers (B), the thermoplastic resin (H) and the compound (I), and may have a structure in which the thermoplastic resin (H) is contained at the outer side of the composite (J) obtained by impregnating the organic fibers (B) with the compound (I), or may be in the form of pellets obtained by melt-kneading the composite (J) and the thermoplastic resin (H).

In the molding material according to the second example, when the organic fiber reinforced molding material (Y) is in the form of pellets obtained by melt-kneading, the average fiber length of the organic fibers (B) is preferably 0.1 mm to 10 mm. When the average fiber length of the organic fibers (B) is within this range, the resulting molded article can contain the organic fibers (B) having a long fiber length, and thus can have an improved impact strength. The average fiber length of the organic fibers (B) is more preferably 1.5 mm to 10 mm.

Further, when the organic fiber reinforced molding material (Y) has a structure in which the thermoplastic resin (H) is contained at the outer side of the composite (J) obtained by impregnating the organic fibers (B) with the compound (I), the organic fibers (B) preferably have a length that is substantially the same as the length of the organic fiber reinforced molding material (Y). When the length of the organic fibers (B) is substantially the same as the length of the organic fiber reinforced molding material (Y), the resulting molded article can contain the organic fibers (B) having a long fiber length, and thus can have excellent mechanical properties. The length of the organic fiber reinforced molding material (Y) refers to a length thereof in the orientation direction of the organic fibers (B) in the organic fiber reinforced molding material. Further, the expression "substantially the same length" means that the organic fibers (B) are not cut intentionally in the molding material, or that the organic fibers (B) significantly shorter than the overall length of the molding material are substantially absent. More specifically, it means that the distance between two edges in the longer direction of the organic fibers (B) in the organic fiber reinforced molding material (Y) is the same as the length of the organic fiber reinforced molding material (Y) in the longer direction. The content of the organic fibers (B) having a length that is 50% or less of the overall length of the molding material is preferably 30% by mass or less, and more preferably 20% by mass or less, with respect to the total amount of organic fibers (B). The molding material is preferably, but not necessarily, continuous and has a cross-sectional shape that is substantially the same across the longer direction. The length of the organic fiber reinforced molding material (Y) is typically 3 mm to 15 mm.

The "average fiber length" as used in the molding material can be determined in the same manner as the average fiber length in the molded article.

As the components (A) to (D) of the molding material according to the second example, it is possible to use the components (A) to (D) described above in the section of the molded article. As the components (H) and (I), the components (C) and (D) described above in the section of the molded article can be used, respectively. In addition, the other components exemplified for the molded article can be contained.

In the molding material according to the second example, the carbon fiber reinforced molding material (X) contains the carbon fibers (A) in an amount of 5 to 45 parts by weight (5 parts by weight or more and 45 parts by weight or less), based on 100 parts by weight of the total amount of the carbon fibers (A), the thermoplastic resin (C), and the compound (D). To further improve the flexural properties and the impact strength of the molded article, the content of the carbon fibers (A) is more preferably 10 parts by weight or more. On the other hand, to improve the dispersibility of the carbon fibers (A) in the molded article and further improve the impact strength of the molded article, the content of the carbon fibers (A) is more preferably 30 parts by weight or less. Further, the carbon fiber reinforced molding material (X) contains the thermoplastic resin (C) in an amount of 35 to 94 parts by weight (35 parts by weight or more and 94 parts by weight or less). The content of the thermoplastic resin (C) is preferably 20 parts by weight or more, and more preferably 30 parts by weight or more. To further improve the impact strength of the molded article, the content of the thermoplastic resin (C) is preferably 85 parts by weight or less, and more preferably 75 parts by weight or less.

The compound (D) is preferably contained in an amount of 1 to 25 parts by weight (1 part by weight or more and 25 parts by weight or less). To improve the flowability and dispersibility of the carbon fibers (A) and the organic fibers (B) during molding, the content of the compound (D) is more preferably 2 parts by weight or more, and still more preferably 4 parts by weight or more. On the other hand, to further improve the flexural strength, tensile strength and impact strength of the molded article, the content of the compound (D) is more preferably 20 parts by weight or less, and still more preferably 15 parts by weight or less.

The organic fiber reinforced molding material (Y) contains the organic fibers (B) in an amount of 1 to 45 parts by weight (1 part by weight or more and 45 parts by weight or less) based on 100 parts by weight of the organic fibers (B), thermoplastic resin (H) and the compound (I). To further improve the impact properties of the molded article, the content of the organic fibers (B) is preferably 5 parts by weight or more. To improve the dispersibility of the organic fibers (B) in the molded article and further improve the impact strength of the molded article, the content of the organic fibers (B) is more preferably 30 parts by weight or less. Further, the organic fiber reinforced molding material (Y) contains the thermoplastic resin (H) in an amount of 35 to 94 parts by weight (35 parts by weight or more and 94 parts by weight or less). The content of the thermoplastic resin (H) is preferably 20 parts by weight or more, and more preferably 30 parts by weight or more. To further improve the impact strength of the molded article, the content of the thermoplastic resin (H) is preferably 85 parts by weight or less, and more preferably 75 parts by weight or less.

The compound (I) is contained in an amount of 1 to 25 parts by weight. To improve the flowability and dispersibility of the carbon fibers (A) and the organic fibers (B) during molding, the content of the compound (I) is more preferably 2 parts by weight or more, and still more preferably 4 parts by weight or more. On the other hand, to further improve the flexural strength, tensile strength, and impact strength of the molded article, the content of the compound (I) is more preferably 20 parts by weight or less, and still more preferably 15 parts by weight or less.

The carbon fiber reinforced molding material (X) in the molding material according to the second example can be obtained, for example, by the following method. First, a roving of carbon fibers (A) is aligned in the longer direction of fiber, and then the carbon fiber bundle is impregnated with a molten compound (D) to prepare a composite (G). The composite (G) is then guided to an impregnation die filled with a molten thermoplastic resin (C) to coat the outer surface of the composite (G) with the thermoplastic resin (C), and pultruded through a nozzle. The pultruded product is cooled and solidified, and then pelletized to a predetermined length to obtain a molding material. The thermoplastic resin (C) may be impregnated into the carbon fiber bundle as long as it is contained at the outer side of the composite (G). The organic fiber reinforced molding material (Y) in the molding material according to the second example may be produced, for example, by the same method as that used for the above described carbon fiber reinforced molding material (X). Alternatively, the organic fiber reinforced molding material (Y) can be obtained, for example, by the following method. Specifically, an organic fiber bundle is first impregnated with a molten compound (I) to prepare a composite (J); the composite (J) is melt-kneaded together with a thermoplastic resin (H) in a single- or twin-screw extruder and the resultant is discharged through a die tip into a strand; and the strand is cooled and solidified, and then pelletized to a predetermined length to obtain a molding material.

By mixing the carbon fiber reinforced molding material (X) and the organic fiber reinforced molding material (Y), as components of the molding material according to the second example, by dry blending, and molding the resulting mixture, it is possible to obtain a fiber reinforced thermoplastic resin molded article excellent in dispersibility of the carbon fibers (A) and the organic fibers (B), impact strength, and low-temperature impact strength. As for the mixing ratio of the carbon fiber reinforced molding material (X) to the organic fiber reinforced molding material (Y), the carbon fiber reinforced molding material (X) and the organic fiber reinforced molding material (Y) are preferably contained in an amount of 50 to 80 parts by weight and 20 to 50 parts by weight, respectively, based on 100 parts by weight of the total amount of the carbon fiber reinforced molding material (X) and the organic fiber reinforced molding material (Y). In addition, the use of the organic fiber reinforced molding material (Y) produced by melt-kneading allows for producing a fiber reinforced thermoplastic resin molded article with higher productivity. A preferred molding method is one using a mold, and various known methods such as injection molding, extrusion molding, and press molding can be used. In particular, a molding method using an injection molding machine produces molded articles continuously and stably.

The organic fibers (B) in the molding material according to the second example have a number average fiber diameter ($d_B$) of 35 to 300 μm (35 μm or more and 300 μm or less). Since the number average fiber diameter ($d_B$) of the organic fibers (B) generally does not change before and after the production process of the molding material, it is possible to easily adjust the number average fiber diameter ($d_B$) of the organic fibers (B) in the molding material within the above described desired range, by adjusting the number average fiber diameter ($d_B$) of the organic fibers (B) as a raw material to 35 to 300 The number average fiber diameter ($d_B$) of the organic fibers (B) in the molding material is more preferably 50 μm or more and 150 μm or less.

The "number average fiber diameter" of the organic fibers (B) refers to an average fiber diameter calculated according to the following equation.

$$\text{Number average fiber diameter} = \Sigma/(di \times Ni)/\Sigma(Ni)$$

di: fiber diameter (μm)
Ni: number of organic fibers having a fiber diameter di

The number average fiber diameter of the organic fibers in the molding material can be determined in the same manner as the number average fiber diameter of the organic fibers in the molded article.

Further, in the molding materials according to the first and the second examples, the organic fibers (B) preferably have an aspect ratio ($L_B$ [μm]/$d_B$ [μm]) of 10 to 500 (10 or more and 500 or less).

As described above regarding the aspect ratio of the organic fibers (B) in the molded article, examples of means of adjusting the aspect ratio in the above range include balancing the average fiber length and the number average fiber diameter. When the aspect ratio of the organic fibers (B) is adjusted to 10 or more, the load applied upon impact can be transmitted to the organic fibers, thereby further improving the impact strength of the molded article. The aspect ratio of the organic fibers (B) is more preferably 20 or more. On the other hand, when the aspect ratio of the organic fibers (B) is adjusted to 500 or less, it is possible to inhibit generating the surface asperity of the molded article due to the organic fibers (B), and a further improved surface appearance can be achieved.

The aspect ratio of the organic fibers (B) in the molding material can be calculated from the average fiber diameter and the number average fiber length of the organic fibers (B) present in the molding material. The number average fiber diameter of the organic fibers (B) in the molding material can be determined according to the above described method. Further, the average fiber length of the organic fibers (B) in the molding material can be measured according to the following method. A molding material is heated on a hot stage set at 300° C. in a state sandwiched between glass plates, to form a film in which fibers are uniformly dispersed. The film in which organic fibers are uniformly dispersed is observed under a light microscope (at 50 to 200×). The fiber lengths of randomly selected 1,000 organic fibers (B) are measured, and the average fiber length ($L_B$) is calculated according to the following equation.

$$\text{Average fiber length} = \Sigma(Mi^2 \times Ni)/\Sigma(Mi \times Ni)$$

Mi: fiber length (mm)
Ni: number of organic fibers having a fiber length Mi

The aspect ratio of the organic fibers (B) in the molding material can be adjusted within the above described preferred range, for example, by adjusting the average fiber length and the number average fiber diameter of the organic fibers (B) in the molding material within the above described preferred ranges.

A method of producing the molding material will now be described.

The molding material according to the first example can be obtained, for example, by the following method. First, a roving of carbon fibers (A) and a roving of organic fibers (B) are doubled in parallel to the longer direction of fiber to prepare a fiber bundle (E) including the carbon fibers (A) and the organic fibers (B). The fiber bundle (E) is then impregnated with a molten compound (D) to prepare a composite (F). The composite (F) is guided to an impregnation die filled with a molten thermoplastic resin (C) to coat the outer surface of the composite (F) with the thermoplastic resin (C), and pultruded through a nozzle. The pultruded product is cooled and solidified, and then pelletized to a predetermined length to obtain a molding material. The thermoplastic resin (C) may be impregnated into the fiber bundle (E) as long as it is contained at the outer side of the composite (F). Further, the molding material according to the second example can be obtained, for example, by the following method. First, a roving of carbon fibers (A) is drawn in the longer direction of fiber, and then the roving of the carbon fibers (A) is impregnated with a molten compound (D) to prepare a composite (G). The composite (G) is then guided to an impregnation die filled with a molten thermoplastic resin (C) to coat the outer surface of the composite (G) with the thermoplastic resin (C), and pultruded through a nozzle. The pultruded product is cooled and solidified, and then pelletized to a predetermined length to obtain a carbon fiber reinforced molding material (X). Further, a roving of organic fibers (B) having a number average fiber diameter ($d_B$) of 35 to 300 μm is drawn in the longer direction of fiber, and then the roving of the organic fibers (B) is impregnated with a molten compound (I) to prepare a composite (J). The composite (J) is then guided to an impregnation die filled with a molten thermoplastic resin (H) to coat the outer surface of the composite (J) with the thermoplastic resin (H), and pultruded through a nozzle. The pultruded product is cooled and solidified, and then pelletized to a predetermined length to obtain an organic fiber reinforced molding material (Y). Alternatively, an organic fiber bundle is impregnated with a molten compound (I) to prepare a composite (J); the composite (J) is melt-kneaded together with a thermoplastic resin (H) in a single- or twin-screw extruder, and the resultant is discharged through a die tip into a strand; and the strand is cooled and solidified, and then pelletized to a predetermined length to obtain an organic fiber reinforced molding material (Y). Then, the thus produced two types of molding materials, namely, the organic fiber reinforced molding materials (X) and (Y), are dry blended to obtain a molding material. The thermoplastic resin (C) or (H) may be impregnated into the roving of the carbon fibers (A) or the roving of the organic fibers (B), as long as the thermoplastic resin (C) or (H) is contained at the outer side of the roving of the carbon fibers (A) or the roving of the organic fibers (B).

The molded article is a fiber reinforced thermoplastic resin molded article excellent in impact strength. The molded article is suitably used, for example, for: automotive parts such as instrument panels, door beams, underside covers, lamp housings, pedal housings, radiator supports, spare tire covers, and various modules at a front end and the like; parts of home and office electrical appliances such as telephones, facsimiles, VTRs, copying machines, televisions, microwave ovens, audio equipment, toiletry goods, "LASER DISC (registered trademark)", refrigerators, and air-conditioners; and members for use in electrical and electronic equipment, represented by housings used for personal computers and cellular phones, and keyboard supports for supporting a keyboard in a personal computer. Among these, the molded article is preferably used for parts such as instrument panels, housings used for electrical and electronic equipment as applications in which good appearance is required in many cases and impact strength is also deemed important.

EXAMPLES

Our molding materials and molded articles will now be described in more detail with reference to Examples, but these examples are not intended to limit this disclosure in any way. First, methods of evaluating various properties used in the Examples will be described.

(1) Measurement of Melt Viscosity

For each of the thermoplastic resins (C) and (H) and the compounds (D) and (I) used in Examples and Comparative Examples, the melt viscosity at 200° C. was measured with a viscoelasticity meter at 0.5 Hz using a 40-mm parallel plate.

(2) Measurement of Average Fiber Lengths of Carbon Fibers (A) and Organic Fibers (B) in Molded Article and Molding Material A molded article or a molding material was heated on a hot stage set at 300° C. in a state sandwiched between glass plates, to form a film in which fibers were uniformly dispersed. The film in which the carbon fibers (A) or the organic fibers (B) were uniformly dispersed was observed under a light microscope (at 50 to 200×). The fiber lengths of randomly selected 1,000 carbon fibers (A) and randomly selected 1,000 organic fibers (B) were measured, and the average fiber length of each type of the fibers was calculated according to the following equation.

$$\text{Average fiber length} = \Sigma(Mi^2 \times Ni)/\Sigma(Mi \times Ni)$$

Mi: fiber length (mm)
Ni: number of fibers having a fiber length Mi (3) Measurement of Number Average Fiber Diameters of Carbon Fibers (A) and Organic Fibers (B) in Molded Article and Molding Material A molded article or a molding material was heated on a hot stage set at 300° C. in a state sandwiched between glass plates, to form a film in which fibers were uniformly dispersed. The film in which the carbon fibers (A) or the organic fibers (B) were uniformly dispersed was observed under a light microscope (at 5 to 1,000×). The fiber diameters of randomly selected 10 carbon fibers (A) or organic fibers (B) were measured, and the number average fiber diameter was calculated according to the following equation. The fiber diameter of a single fiber of the carbon fibers (A) or the organic fibers (B) as used herein refers to, as shown in FIG. 4, the shortest distance (6) between the arbitrary point B on the fiber contour A (4) and the fiber contour A' (5) opposite to the fiber contour A (4), in each carbon fiber (A) or organic fiber (B) to be observed. A number average value obtained by: measuring the fiber diameter at randomly selected 20 locations per one piece of carbon fiber (A) or organic fiber (B); and calculating the average of the measured values at the total 200 locations, was defined as the number average fiber diameter. When the number of the carbon fibers (A) or the organic fibers (B) present within an observation area was less than 10 pieces, the observation area was moved as appropriate to a new area in which 10 pieces of the carbon fibers (A) or the organic fibers (B) could be observed.

Number average fiber diameter=$\Sigma/(di \times Ni)/\Sigma(Ni)$ di: fiber diameter (μm)

Ni: number of fibers having a fiber diameter di (4) Measurement of Ratio ($n_B/n_A$) of Calculated Number of Organic Fibers (B) to Calculated Number of Carbon Fibers (A) in Molded Article The carbon fibers (A) and the organic fibers (B) were retrieved from an ISO-type dumbbell test specimen obtained in each of Examples and Comparative Examples, and the specific gravity of each type of fibers was measured using a liquid immersion method. The carbon fibers were retrieved by subjecting the test specimen to a heat treatment under a nitrogen atmosphere at 500° C. for 30 minutes. The organic fibers (B) were retrieved by dissolving the test specimen in 1-chloronaphthalene to retrieve the carbon fibers (A) and the organic fibers (B), and then introducing the retrieved fibers into chloroform to allow the carbon fibers (A) to settle down, and the organic fibers (B) to float, thereby separating the fibers. Using distilled water as a liquid to be used in the liquid immersion method, the measurement of the specific gravity was carried out on 5 pieces of test specimens, and the average value thereof was calculated. The calculated number of fibers was calculated from the number average fiber diameter d (μm), average fiber length L (mm), fiber content w (% by mass), and specific gravity ρ (g/cm³) of each type of fibers, obtained by the methods described above, according to the following equation.

Calculated number of fibers=$((1 \times w/100)/((d/2)^2 \times \pi \times L \times \rho)) \times 10^9$ (5) Measurement of Tensile Break Elongation The tensile break elongation (%) of the organic fibers (B) was measured as follows: a tensile test was carried out in a room under standard conditions (20° C., 65% RH) at a chuck distance of 250 mm and a tensile speed of 300 mm/min, and the length at fiber break was measured (breakages in the vicinity of chucks were considered as a chucking breakage and excluded from the resulting data), calculated to the second decimal place by the following equation, and rounded to one decimal place. The average value of the measured values (number of data: n=3) was calculated, for each organic fibers (B), and defined as the tensile break elongation.

Tensile break elongation (%)=[(length at break (mm)−250)/250]×100

(6) Measurement of Flexural Strength of Molded Article

For each of the ISO dumbbell specimens obtained in Examples and Comparative Examples, the flexural strength was measured in accordance with ISO 178, using a 3-point bend fixture (indenter radius: 5 mm) at a fulcrum distance of 64 mm, under test conditions of a testing speed of 2 mm/min. "INSTRON" (registered trademark) universal tester model 5566 (manufactured by Instron) was used as a tester.

(7) Measurement of Charpy Impact Strength of Molded Article

A parallel portion of each of the ISO dumbbell specimens obtained in Examples and Comparative Examples was cut out, and a V-notch Charpy impact test was performed in accordance with ISO179, using a C1-4-01 model tester manufactured by Tokyo Testing Machine Inc. to calculate the impact strength (kJ/cm²).

(8) Evaluation of Productivity of Molding Material

The production volume of the organic fiber reinforced molding material (Y) per hour was determined. Those produced at a production volume of 10 kg/hr or more were evaluated as A, and those produced at a production volume of less than 10 kg/hr were evaluated as B.

(9) Evaluation of Fiber Dispersibility in Molded Article Obtained Using Molding Material For each of the specimens of 80 mm×80 mm×2 mm obtained in Examples and Comparative Examples, the number of undispersed carbon fiber bundles existing on the front and back surfaces was visually counted. The fiber dispersibility was evaluated based on the total sum of the number of undispersed carbon fiber bundles on 50 molded articles, according to the following criteria. Those evaluated as A and B were regarded as acceptable.

A: Less than 1 undispersed carbon fiber bundle

B: Not less than 1 and less than 5 undispersed carbon fiber bundles

C: Not less than 5 and less than 10 undispersed carbon fiber bundles

D: 10 or more undispersed carbon fiber bundles

(10) Evaluation of Painted Surface Appearance

Each of the specimens of 80 mm×80 mm×2 mm obtained in Examples and Comparative Examples was painted with acryl-urethane two-pack paint (Urethane PG60/hardener, manufactured by Kansai Paint Co., Ltd.) so that the paint thickness was 30 μm, by using paint robot (KE610H, manufactured by Kawasaki Heavy Industries, Ltd.) and cartridge bell manufactured by ABB K.K. and each painted specimen was dried at drying temperature 80° C. for 30 min. The painted surface appearance was visually evaluated based on definition and appearance of the obtained painted molded articles, according to the following criteria. Those evaluated as A and B were regarded as acceptable and C and D were regarded as inacceptable.

A: High sense of glossiness was observed

B: Sense of glossiness was observed but not so high sense of glossiness

C: Partial uneven paint was observed

D: Uneven paint was observed overall

Reference Example 1 Preparation of Carbon Fibers (A)

A copolymer comprising polyacrylonitrile as a major component was subjected to spinning, firing, and surface oxidation to obtain continuous carbon fibers with a total fiber count of 24,000, a single fiber diameter of 7 μm, a mass per unit length of 1.6 g/m, a specific gravity of 1.8 g/cm³, and a surface oxygen concentration ratio [O/C] of 0.2. These continuous carbon fibers had a strand tensile strength of 4,880 MPa and a strand tensile modulus of 225 GPa. Subsequently, a mother liquor of a sizing agent was prepared by dissolving polyglycerol polyglycidyl ether as a polyfunctional compound in water to a concentration of 2% by weight, and the resulting sizing agent was applied to the carbon fibers by a dipping method and dried at 230° C. The amount of sizing agent deposited on the carbon fibers thus obtained was 1.0% by weight.

Reference Example 2 Organic Fibers (B)

Polyester (PET) fibers 1: "TETORON" (registered trademark) 56T-36-262 manufactured by Toray Industries, Inc.

(single fiber fineness: 1.6 dtex, fiber diameter: 12 μm, melting point: 260° C.) were used. The elongation at break of the fibers was measured by the method described in (5) above to be 15%.

Polyester fibers 2: "TETORON" (registered trademark) 2200T-480-705M manufactured by Toray Industries, Inc. (single fiber fineness: 4.6 dtex, fiber diameter: 20 μm, melting point: 260° C.) were used. The elongation at break of the fibers was measured by the method described in (5) above to be 15%.

Polyester (PET) fibers 3: Dried PET pellets (PET pellets) having viscosity [η] of 0.94 and COOH terminal group concentration of 13 eq/$10^6$ g, produced by publicly known melt polycondensation and solid-phase polycondensation, were continuously supplied to a single-screw extruder through hopper of the single-screw extruder while metering. At the same time, heat melted "STABILIZER" (registered trademark) 7000 (manufactured by Raschig AG) at 80° C. as a monocarbodiimide compound (TIC) was continuously supplied while metering at the weight ratio of 1.3 parts by weight to 100 parts by weight of the above PET pellets in a pipe set at the bottom of the hopper. Melted polymer melt-kneaded at about 288° C. for 3 min in the single-screw extruder passed through a gear pump, a filter layer in spinning pack and was discharged from a spinning orifice for fibers having circular cross section. The spun filaments were cooled in water bath of 70° C. and then stretching and heat set were conventionally executed at the total stretching ratio of 5.0 times, to obtain polyester fibers having circular cross section of 35 μm diameter (single fiber fineness: 13 dtex, fiber diameter: 35 μm, melting point: 260° C.). The elongation at break of the fibers was measured by the method described in (5) above to be 15%.

Polyester (PET) fibers 4: Polyester fibers having circular cross section of 50 μm diameter (single fiber fineness: 27 dtex, fiber diameter: 50 μm, melting point: 260° C.) were obtained in the same manner as PET fibers 3 above, except for changing the size of spinning orifice for fibers having circular cross section. The elongation at break of the fibers was measured by the method described in (5) above to be 15%.

Polyester (PET) fibers 5: Polyester fibers having circular cross section of 100 μm diameter (single fiber fineness: 108 dtex, fiber diameter: 100 μm, melting point: 260° C.) were obtained in the same manner as PET fibers 3 above, except for changing size of spinning orifice for fibers having circular cross section. The elongation at break of the fibers was measured by the method described in (5) above to be 15%.

Polyester (PET) fibers 6: Polyester fibers having circular cross section of 290 μm diameter (single fiber fineness: 975 dtex, fiber diameter: 290 μm, melting point: 260° C.) were obtained in the same manner as PET fibers 3 above, except for changing size of spinning orifice for fibers having circular cross section. The elongation at break of the fibers was measured by the method described in (5) above to be 15%.

Reference Example 3 Thermoplastic Resins (C) and (H)

A pellet blend of PP: a polypropylene resin ("PRIME POLYPRO" (registered trademark) J137 manufactured by Prime Polymer Co., Ltd.) and a maleic acid-modified polypropylene resin ("ADMER" (registered trademark) QE840 manufactured by Mitsui Chemicals, Inc.) (PP), blended at a weight ratio of 85/15, was used. The melt viscosity at 200° C. was measured by the method described in (1) above to be 50 Pa·s.

PC: a polycarbonate resin ("PANLITE" (registered trademark) L-1225L manufactured by Idemitsu Kosan Co., Ltd.) was used. In the same manner as in the above described polypropylene resin, the melt viscosity at 200° C. was measured by the method described in (1) above to be 14,000 Pa·s.

Reference Example 4 Compounds (D) and (I)

A solid hydrogenated terpene resin ("CLEARON" (registered trademark) P125 manufactured by Yasuhara Chemical Co., Ltd., softening point: 125° C.) was used. The above resin was introduced into a tank in an impregnation aid applicator. The temperature in the tank was set at 200° C., and the resin was heated for 1 hour to a molten state. The melt viscosity at 200° C. of the resulting resin at this time was measured by the method described in (1) above to be 1 Pa·s.

Production Example 1 Carbon Fiber Reinforced Thermoplastic Resin Molding Material (X-1)

A composite (G) obtained by impregnating a bundle of the carbon fibers (A) described above with the compound (D) at the ratio shown in Table 1 was passed through a coating die for wire coating mounted at the end of a TEX-30α model twin-screw extruder (screw diameter: 30 mm, L/D=32) manufactured by Japan Steel Works, LTD. Meanwhile, the thermoplastic resin (C) shown in Table 1 was supplied from a main hopper of the TEX-30α model twin-screw extruder and melt-kneaded at a screw speed of 200 rpm. The molten thermoplastic resin (C) was discharged from the twin-screw extruder into the die such that the molten thermoplastic resin (C) was disposed continuously surrounding the composite (G). The resulting strand was cooled and then cut with a cutter into pellets with a length of 7 mm to provide long-fiber pellets (X-1) in which the length of the bundle of the carbon fibers (A) and the length of the molding material are substantially the same. The take-up speed of the bundle of the carbon fibers (A) was adjusted such that the amount of the carbon fibers (A) was 30 parts by weight based on 100 parts by weight of the total amount of (A), (C), and (D).

Production Example 2 Carbon Fiber Reinforced Thermoplastic Resin Molding Material (X-2)

Long-fiber pellets (X-2) were prepared in the same manner as in Production Example 1 above. The take-up speed of the bundle of the carbon fibers (A) was adjusted such that the amount of the carbon fibers (A) was 40 parts by weight based on 100 parts by weight of the total amount of (A), (C), and (D).

Production Example 3 Organic Fiber Reinforced Thermoplastic Resin Molding Material (Y-1)

A composite (J) obtained by impregnating a bundle of the organic fibers (B) described above with the compound (I) at the ratio shown in Table 1 was passed through a coating die for wire coating mounted at the end of a TEX-30α model twin-screw extruder (screw diameter: 30 mm, L/D=32) manufactured by Japan Steel Works, LTD. Meanwhile, the thermoplastic resin (H) shown in Table 1 was supplied from a main hopper of the TEX-30α model twin-screw extruder and melt-kneaded at a screw speed of 200 rpm. The molten thermoplastic resin (H) was discharged from the twin-screw extruder into the die such that the molten thermoplastic resin (H) was disposed continuously surrounding the composite (J). The resulting strand was cooled and then cut with a cutter into pellets with a length of 7 mm to provide long-fiber pellets (Y-1) in which the length of the bundle of the organic fibers (B) and the length of the molding material are substantially the same. The take-up speed of the bundle of the organic fibers (B) was adjusted such that the amount of the organic fibers (B) was 30 parts by weight based on 100 parts by weight of the total amount of (B), (H), and (I).

Production Example 4 Organic Fiber Reinforced Thermoplastic Resin Molding Material (Y-2)

Long-fiber pellets (Y-2) were prepared in the same manner as in Production Example 3 above. The take-up speed of the bundle of the organic fibers (B) was adjusted such that the amount of the organic fibers (B) was 40 parts by weight based on 100 parts by weight of the total amount of (B), (H), and (I).

Production Example 5 Organic Fiber Reinforced Thermoplastic Resin Molding Material (Y-3)

Long-fiber pellets (Y-3) were prepared in the same manner as in Production Example 3 above. The take-up speed of the bundle of the organic fibers (B) was adjusted such that the amount of the organic fibers (B) was 50 parts by weight based on 100 parts by weight of the total amount of (B), (H), and (I).

Production Example 6 Organic Fiber Reinforced Thermoplastic Resin Molding Material (Y-4)

A composite (J) obtained by impregnating a bundle of the organic fibers (B) described above with the compound (I) at the ratio shown in Table 1 was melt-kneaded in a cylinder at a screw speed of 200 rpm together with the thermoplastic resin (H) molten in a TEX-30α model twin-screw extruder (screw diameter: 30 mm, L/D=32) manufactured by Japan Steel Works, LTD. The strand discharged through a die tip was cooled and solidified, and then cut with a cutter into pellets with a length of 7 mm to prepare pellets (Y-4). The take-up speed of the bundle of the organic fibers (B) was adjusted such that the amount of the organic fibers (B) was 30 parts by weight based on 100 parts by weight of the total amount of (B), (H), and (I).

Example 1

An apparatus for producing long-fiber reinforced resin pellets, the apparatus including a coating die for wire coating mounted at the end of a TEX-30α model twin-screw extruder (screw diameter: 30 mm, L/D=32) manufactured by Japan Steel Works, LTD., was used. The cylinder temperature of the extruder was set at 220° C., and the thermoplastic resin (C) shown in Table 2 was supplied from a main hopper of the apparatus, and melt-kneaded at a screw speed of 200 rpm. While adjusting the discharge rate such that the amount of the compound (D) which had been melted by heating at 200° C. to be 8 parts by weight based on 100 parts by weight of the total amount of the components (A) to (C), a fiber bundle (E) composed of the carbon fibers (A) and the organic fibers (B) was supplied at a die port (3 mm in diameter) from which the molten thermoplastic resin (C) is discharged so that the thermoplastic resin (C) was disposed continuously surrounding the bundle. In an internal cross section of the fiber bundle (E) at this time, the carbon fibers (A) and the organic fibers (B) were unevenly distributed. They were unevenly distributed such that at least a portion of the carbon fibers (A) and at least a portion of the organic fibers (B) were in contact with the thermoplastic resin (C). The resulting strand was cooled and then cut with a cutter into pellets with a length of 7 mm to obtain long-fiber pellets. The take-up speed was adjusted such that the amount of the carbon fibers (A) was 20 parts by weight, and the amount of the organic fibers (B) was 10 parts by weight based on 100 parts by weight of the total amount of the components (A) to (C).

The long-fiber pellets thus obtained were injection molded using an injection molding machine J110AD manufactured by Japan Steel Works, LTD. under the conditions of: an injection time of 5 seconds; a back pressure of 5 MPa; a holding pressure of 20 MPa; a pressure holding time of 10 seconds; a cylinder temperature of 230° C.; and a mold temperature of 60° C., to prepare an ISO dumbbell specimen and a specimen of 80 mm×80 mm×2 mm, as molded articles. The cylinder temperature as used above refers to the temperature of a portion for heating and melting a molding material in the injection molding machine, and the mold temperature refers to the temperature of a mold into which a resin is injected to be formed into a desired shape. The properties of the resulting specimens (molded articles) were evaluated after allowing them to stand in a constant temperature and humidity room conditioned at 23° C. and 50% RH for 24 hours. The evaluation was carried out according to the methods described above, and the results are summarized in Table 2.

Example 2

Molded articles were prepared and evaluated in the same manner as in Example 1 except that the polyester (PET) fibers 4 were used as the organic fibers (B). The evaluation results are summarized in Table 2.

Example 3

Molded articles were prepared and evaluated in the same manner as in Example 1, except that the polyester (PET) fibers 5 were used as the organic fibers (B). The evaluation results are summarized in Table 2.

Example 4

Molded articles were prepared and evaluated in the same manner as in Example 1 except that the polyester (PET) fibers 6 were used as the organic fibers (B). The evaluation results are summarized in Table 2.

Example 5

Long-fiber pellets were prepared and evaluated in the same manner as in Example 3 except that the injection time was set at three seconds and back pressure was set at 10 MPa in the injection conditions. The evaluation results are summarized in Table 2.

Example 6

Long-fiber pellets were prepared and evaluated in the same manner as in Example 2 except that the amounts of the carbon fibers (A), the thermoplastic resin (C), and the compound (D) were 30 parts by weight, 60 parts by weight, and 11 parts by weight, respectively, based on 100 parts by weight of the total amount of the components (A) to (C). The evaluation results are summarized in Table 3.

Example 7

Long-fiber pellets were prepared and evaluated in the same manner as in Example 2 except that the amounts of the organic fibers (B), the thermoplastic resin (C), and the compound (D) were 30 parts by weight, 50 parts by weight, and 14 parts by weight, respectively, based on 100 parts by weight of the total amount of the components (A) to (C). The evaluation results are summarized in Table 3.

Example 8

Long-fiber pellets were prepared and evaluated in the same manner as in Example 2 except that the carbon fibers (A) and the organic fibers (B) were disposed in the fiber bundle (E) such that the carbon fibers (A) envelop the organic fibers (B). The evaluation results are summarized in Table 3.

Example 9

Long-fiber pellets were prepared and evaluated in the same manner as in Example 1 except that the carbon fibers (A) and the organic fibers (B) were disposed in the fiber bundle (E) such that the organic fibers (B) envelop the carbon fibers (A). The evaluation results are summarized in Table 3.

Example 10

The long-fiber pellets (X-1) obtained in Production Example 1 and the long-fiber pellets (Y-1) obtained in Production Example 3 were dry blended such that the amounts of (X-1) and (Y-1) were 67 parts by weight and 33 parts by weight, respectively, based on 100 parts by weight of the total amount of (X-1) and (Y-1), to prepare a molding material. In the resulting molding material, as a whole, the amounts of the carbon fibers (A), the organic fibers (B), the thermoplastic resin (C), and the compound (D) were 22 parts by weight, 12 parts by weight, 66 parts by weight, and 9 parts by weight, respectively, based on 100 parts by weight of the total amount of the carbon fibers (A), organic fibers (B), and the thermoplastic resin (C). This molding material was evaluated according to the methods described above, and the results are summarized in Table 4.

Example 11

A molding material was prepared and evaluated in the same manner as in Example 9 except that the long-fiber pellets (X-1) obtained in Production Example 1, the long-fiber pellets (Y-2) obtained in Production Example 4, and pellets of the thermoplastic resin (C) shown in Table 4 were dry blended such that the amounts of (X-1), (Y-2), and (C) were 17 parts by weight, 75 parts by weight, and 8 parts by weight, respectively. In the resulting molding material, as a whole, the amounts of the carbon fibers (A), the organic fibers (B), the thermoplastic resin (C), and the compound (D) were 6 parts by weight, 33 parts by weight, 61 parts by weight, and 10 parts by weight, respectively, based on 100 parts by weight of the total amount of the carbon fibers (A), organic fibers (B), and the thermoplastic resin (C). The evaluation results of this molding material are summarized in Table 4.

Example 12

A molding material was prepared and evaluated in the same manner as in Example 9 except that the long-fiber pellets (X-2) obtained in Production Example 2 and the long-fiber pellets (Y-2) obtained in Production Example 4 were dry blended such that the amounts of (X-2) and (Y-2) were 75 parts by weight and 25 parts by weight, respectively, based on 100 parts by weight of the total amount of (X-2) and (Y-2). In the resulting molding material, as a whole, the amounts of the carbon fibers (A), the organic fibers (B), the thermoplastic resin (C), and the compound (D) were 33 parts by weight, 11 parts by weight, 56 parts by weight, and 11 parts by weight, respectively, based on 100 parts by weight of the total amount of the carbon fibers (A), organic fibers (B), and the thermoplastic resin (C). The evaluation results of this molding material are summarized in Table 4.

Example 13

A molding material was prepared and evaluated in the same manner as in Example 10 except that the pellets (Y-4) obtained in Production Example 6 were used in place of the long-fiber pellets (Y-1). In the resulting molding material, as a whole, the amounts of the carbon fibers (A), the organic fibers (B), the thermoplastic resin (C), and the compound (D) were 22 parts by weight, 11 parts by weight, 67 parts by weight, and 9 parts by weight, respectively, based on 100 parts by weight of the total amount of the carbon fibers (A), organic fibers (B), and the thermoplastic resin (C). The evaluation results of this molding material are summarized in Table 4.

Comparative Example 1

Molded articles were prepared and evaluated in the same manner as in Example 1 except that the PET fibers 2 were used as the organic fibers (B). The evaluation results are summarized in Table 5.

Comparative Example 2

Molded articles were prepared and evaluated in the same manner as in Example 1 except that the amounts of the carbon fibers (A), the thermoplastic resin (C), and the compound (D) were 3 parts by weight, 87 parts by weight, and 6 parts by weight, respectively, based on 100 parts by weight of the total amount of the components (A) to (C). The evaluation results are summarized in Table 5.

Comparative Example 3

Molded articles were prepared and evaluated in the same manner as in Example 1 except that the amounts of the carbon fibers (A), the thermoplastic resin (C), and the compound (D) were 50 parts by weight, 40 parts by weight, and 14 parts by weight, respectively, based on 100 parts by weight of the total amount of the components (A) to (C). The evaluation results are summarized in Table 5.

Comparative Example 4

Molded articles were prepared and evaluated in the same manner as in Example 1 except that the amounts of the organic fibers (B), the thermoplastic resin (C), and the compound (D) were 50 parts by weight, 30 parts by weight, and 16 parts by weight, respectively, based on 100 parts by weight of the total amount of (A) to (C). The evaluation results are summarized in Table 5.

Comparative Example 5

Molded articles were prepared and evaluated in the same manner as in Example 1 except that the back pressure in injection molding was adjusted to 13 MPa. The evaluation results are summarized in Table 5.

Comparative Example 6

Molded articles were prepared and evaluated in the same manner as in Example 1 except that the injection time in injection molding was adjusted to 0.5 seconds, and the back pressure was adjusted to 15 MPa. The evaluation results are summarized in Table 5.

Comparative Example 7

Molded articles were prepared and evaluated in the same manner as in Example 1 except that the PET fibers 1 were used as the organic fibers (B). The evaluation results are summarized in Table 5.

Comparative Example 8

Long-fiber pellets were prepared and evaluated in the same manner as in Example 1 except that the amounts of the carbon fibers (A), the organic fibers (B), the thermoplastic resin (C), and the compound (D) were 3 parts by weight, 20 parts by weight, 77 parts by weight, and 8 parts by weight, respectively, based on 100 parts by weight of the total amount of the components (A) to (D). The evaluation results are summarized in Table 6.

Comparative Example 9

Long-fiber pellets were prepared and evaluated in the same manner as in Example 1 except that the amounts of the carbon fibers (A), the organic fibers (B), the thermoplastic resin (C), and the compound (D) were 10 parts by weight, 50 parts by weight, 40 parts by weight, and 16 parts by weight, respectively, based on 100 parts by weight of the total amount of the components (A) to (C). The evaluation results are summarized in Table 5.

Comparative Example 10

Long-fiber pellets were prepared and evaluated in the same manner as in Example 1 except that the carbon fibers (A) and the organic fibers (B) were disposed in an internal cross section of the fiber bundle (E) in the form that was mixed uniformly. The evaluation results are summarized in Table 6.

Comparative Example 11

A molding material was prepared and evaluated in the same manner as in Example 7 except that the long-fiber pellets (X-1) obtained in Production Example 1 and pellets of the thermoplastic resin (C) shown in Table 7 were dry blended such that the amounts of (X-1) and (C) were 67 parts by weight and 33 parts by weight, respectively, based on 100 parts by weight of the total amount of (X-1) and (C). In the resulting molding material, as a whole, the amounts of the carbon fibers (A), the organic fibers (B), the thermoplastic resin (C), and the compound (D) were 20 parts by weight, 0 parts by weight, 80 parts by weight, and 5 parts by weight, respectively, based on 100 parts by weight of the total amount of the carbon fibers (A), organic fibers (B), and the thermoplastic resin (C). The evaluation results of this molding material are summarized in Table 7.

Comparative Example 12

A molding material was prepared and evaluated in the same manner as in Example 7 except that the long-fiber pellets (X-1) obtained in Production Example 1, the long-fiber pellets (Y-3) obtained in Production Example 5, and pellets of the thermoplastic resin (C) shown in Table 7 were dry blended such that the amounts of (X-1), (Y-3), and (C) were 10 parts by weight, 20 parts by weight, and 70 parts by weight, respectively, based on 100 parts by weight of the total amount of (X-1), (Y-3), and (C). In the resulting molding material, as a whole, the amounts of the carbon fibers (A), the organic fibers (B), the thermoplastic resin (C), and the compound (D) were 3 parts by weight, 11 parts by weight, 86 parts by weight, and 3 parts by weight, respectively, based on 100 parts by weight of the total amount of the carbon fibers (A), organic fibers (B), and the thermoplastic resin (C). The evaluation results of this molding material are summarized in Table 7.

TABLE 1

| | | | | Manufacturing Example 1 X-1 | Manufacturing Example 2 X-2 | Manufacturing Example 3 Y-1 | Manufacturing Example 4 Y-2 | Manufacturing Example 5 Y-3 | Manufacturing Example 6 Y-4 |
|---|---|---|---|---|---|---|---|---|---|
| Raw Materials | Carbon Fibers (A) | Amount | Parts by Weight | 30 | 40 | — | — | — | — |
| | Thermoplastic Resin (C) | Type | — | PP | PP | — | — | — | — |
| | | Amount | Parts by Weight | 62 | 50 | — | — | — | — |
| | Compound (D) | Type | — | Terpene | Terpene | — | — | — | — |
| | | Amount | Parts by Weight | 8 | 10 | — | — | — | — |
| | Organic Fibers (B) | Amount | Parts by Weight | — | — | 30 | 40 | 50 | 30 |
| | | Type | — | — | — | PET 4 | PET 4 | PET 4 | PET 4 |
| | | Tensile Breakage Elongation | % | — | — | 15 | 15 | 15 | 15 |

TABLE 1-continued

|  |  | Manufacturing Example 1 X-1 | Manufacturing Example 2 X-2 | Manufacturing Example 3 Y-1 | Manufacturing Example 4 Y-2 | Manufacturing Example 5 Y-3 | Manufacturing Example 6 Y-4 |
|---|---|---|---|---|---|---|---|
| Thermoplastic Resin (H) | Type | — | — | PP | PP | PP | PP |
|  | Amount Parts by Weight | — | — | 62 | 50 | 38 | 62 |
| Compound (I) | Type | — | — | Terpene | Terpene | Terpene | Terpene |
|  | Amount Parts by Weight | — | — | 8 | 10 | 12 | 8 |

TABLE 2

|  |  |  |  | Example 1 | Example 2 | Example 3 | Example 4 | Example 5 |
|---|---|---|---|---|---|---|---|---|
| Raw Materials | Carbon Fibers (A) | Amount | Parts by Weight | 20 | 20 | 20 | 20 | 20 |
|  |  | Fiber Diameter | μm | 7 | 7 | 7 | 7 | 7 |
|  |  | [O/C] | — | 0.2 | 0.2 | 0.2 | 0.2 | 0.2 |
|  | Organic Fibers (B) | Amount | Parts by Weight | 10 | 10 | 10 | 10 | 10 |
|  |  | Type | Type | PET 3 | PET 4 | PET 5 | PET 6 | PET 5 |
|  |  | Fiber Diameter | μm | 35 | 50 | 100 | 290 | 100 |
|  |  | Tensile Breakage Elongation | % | 15 | 15 | 15 | 15 | 15 |
|  | Thermoplastic Resin (C) | Type | — | PP | PP | PP | PP | PP |
|  |  | Amount | Parts by Weight | 70 | 70 | 70 | 70 | 70 |
|  | Compound (D) | Type | — | Terpene | Terpene | Terpene | Terpene | Terpene |
|  |  | Amount | Parts by Weight | 8 | 8 | 8 | 8 | 8 |
| Molding Material | Average Fiber Length | $L_B$ | mm | 7 | 7 | 7 | 7 | 7 |
|  | Number Average Fiber Diameter | $d_B$ | μm | 35.1 | 50.1 | 101.0 | 290.0 | 101.0 |
|  | Aspect Ratio | $L_B/d_B$ | — | 199 | 140 | 69 | 23 | 69 |
| Molded Article | Average Fiber Length | $L_A$ | mm | 1.0 | 1.0 | 1.1 | 1.1 | 0.7 |
|  | Average Fiber Length | $L_B$ | mm | 3.0 | 2.9 | 3.0 | 3.0 | 2.8 |
|  | Number Average Fiber Diameter | $d_B$ | μm | 35.1 | 50.1 | 101.0 | 290.0 | 101.0 |
|  | Aspect Ratio | $L_B/d_B$ | — | 85 | 58 | 30 | 10 | 28 |
|  | Ratio of Calculated Number | $n_B/n_A$ | — | 0.009 | 0.004 | 0.001 | 0.0001 | 0.0008 |
| Evaluation Results | Dispersibility |  | — | A | A | A | A | A |
|  | Charpy Impact Strength |  | kJ/m² | 22.5 | 22.5 | 22.0 | 21.0 | 20.5 |
|  | Flexural Strength |  | MPa | 195 | 195 | 195 | 195 | 195 |
|  | Surface Appearance |  | — | B | B | A | B | B |

TABLE 3

|  |  |  |  | Example 6 | Example 7 | Example 8 | Example 9 |
|---|---|---|---|---|---|---|---|
| Raw Materials | Carbon Fibers (A) | Amount | Parts by Weight | 30 | 20 | 20 | 20 |
|  |  | Fiber Diameter | μm | 7 | 7 | 7 | 7 |
|  |  | [O/C] | — | 0.2 | 0.2 | 0.2 | 0.2 |
|  | Organic Fibers (B) | Amount | Parts by Weight | 10 | 30 | 10 | 10 |
|  |  | Type | Type | PET 4 | PET 4 | PET 4 | PET 4 |
|  |  | Fiber Diameter | μm | 50 | 50 | 50 | 50 |
|  |  | Tensile Breakage Elongation | % | 15 | 15 | 15 | 15 |
|  | Thermoplastic Resin (C) | Type | — | PP | PP | PP | PC |
|  |  | Amount | Parts by Weight | 60 | 50 | 70 | 70 |
|  | Compound (D) | Type | — | Terpene | Terpene | Terpene | Terpene |
|  |  | Amount | Parts by Weight | 11 | 14 | 8 | 8 |

TABLE 3-continued

|  |  |  |  | Example 6 | Example 7 | Example 8 | Example 9 |
|---|---|---|---|---|---|---|---|
| Molding Material | Average Fiber Length | $L_B$ | mm | 7 | 7 | 7 | 7 |
|  | Number Average Fiber Diameter | $d_B$ | μm | 50.1 | 50.0 | 50.1 | 50.1 |
|  | Aspect Ratio | $L_B/d_B$ | — | 140 | 140 | 140 | 140 |
| Molded Article | Average Fiber Length | $L_A$ | mm | 0.9 | 1.0 | 1.1 | 1.2 |
|  | Average Fiber Length | $L_B$ | mm | 2.8 | 3.0 | 2.9 | 2.9 |
|  | Number Average Fiber Diameter | $d_B$ | μm | 50.1 | 50.0 | 50.1 | 50.1 |
|  | Aspect Ratio | $L_B/d_B$ | — | 56 | 60 | 58 | 58 |
|  | Ratio of Calculated Number | $n_B/n_A$ | — | 0.003 | 0.013 | 0.005 | 0.005 |
| Molding Material Constitution | Fiber Arrangement |  | — | Unevenly distributed | Unevenly distributed | Unevenly distributed | Unevenly distributed |
|  | Cross section of Fiber Bundle (E) | (A) includes (B) | — | — | — | YES | — |
|  |  | (B) includes (A) | — | — | — | — | YES |
|  |  | At least each one part of (A) and (B) contacts to (C) | — | YES | YES | — | — |
| Evaluation Results | Dispersibility |  | — | A | B | B | B |
|  | Charpy Impact Strength |  | kJ/m² | 25.0 | 26.0 | 22.5 | 22.0 |
|  | Flexural Strength |  | MPa | 240 | 180 | 195 | 195 |
|  | Surface Appearance |  | — | A | B | B | B |

TABLE 4

|  |  |  |  | Example 10 | Example 11 | Example 12 | Example 13 |
|---|---|---|---|---|---|---|---|
| Molding Material | Carbon Fiber Reinforced Thermoplastic Resin Molding Material (X-1) | Amount | Parts by Weight | 67 | 17 | — | 67 |
|  | Carbon Fiber Reinforced Thermoplastic Resin Molding Material (X-2) | Amount | Parts by Weight | — | — | 75 | — |
|  | Thermoplastic Resin (C) | Type | — | — | PP | — | — |
|  |  | Amount | Parts by Weight | — | 8 | — | — |
|  | Organic Fiber Reinforced Thermoplastic Resin Molding Material (Y-1) | Amount | Parts by Weight | 33 | — | — | — |
|  | Pellet Length 7 mm | Organic Fiber Type | — | PET 4 | — | — | — |
|  |  | Aspect Ratio $L_B/d_B$ | — | 140 | — | — | — |
|  |  | Tensile Breakage Elongation | % | 15 | — | — | — |
|  | Organic Fiber Reinforced Thermoplastic Resin Molding Material (Y-2) | Amount | Parts by Weight | — | 75 | 25 | — |
|  | Pellet Length 7 mm | Organic Fiber Type | — | — | — | PET 4 | PET 4 |
|  |  | Aspect Ratio $L_B/d_B$ | — | — | — | 140 | 140 |
|  |  | Tensile Breakage Elongation | % | — | — | 15 | 15 |
|  | Organic Fiber Reinforced Thermoplastic Resin Molding Material (Y-3) | Amount | Parts by Weight | — | — | — | — |
|  | Pellet Length 7 mm | Organic Fiber Type | Type | — | — | — | — |
|  |  | Aspect Ratio $L_B/d_B$ | — | — | — | — | — |
|  |  | Tensile Breakage Elongation | % | — | — | — | — |
|  | Organic Fiber Reinforced Thermoplastic Resin Molding Material (Y-4) (Manufactured by melt-kneading) | Amount | Parts by Weight | — | — | — | 33 |
|  | PET 4 Average Fiber Length 2.5 mm | Organic Fiber Type | Type | — | — | — | PET 4 |
|  |  | Aspect Ratio $L_B/d_B$ | — | — | — | — | 50 |
|  |  | Tensile Breakage Elongation | % | — | — | — | 15 |
| Molded Article | Average Fiber Length | $L_A$ | mm | 1.0 | 1.0 | 1.0 | 1.0 |
|  | Average Fiber Length | $L_B$ | mm | 3.0 | 2.9 | 2.9 | 1.8 |
|  | Number Average Fiber Diameter | $d_B$ | μm | 50.0 | 50.0 | 50.1 | 50.1 |
|  | Aspect Ratio | $L_B/d_B$ | — | 60 | 58 | 58 | 36 |
|  | Ratio of Calculated Number | $n_B/n_A$ | — | 0.004 | 0.053 | 0.003 | 0.007 |
| Evaluation Results | Productivity |  | — | B | B | B | A |
|  | Dispersibility |  | — | A | A | B | A |
|  | Charpy Impact Strength |  | kJ/m² | 22.5 | 25.0 | 23.0 | 21.0 |
|  | Flexural Strength |  | MPa | 195 | 140 | 235 | 195 |
|  | Surface Appearance |  | — | A | B | B | A |

TABLE 5

| | | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Raw Materials | Carbon Fibers (A) | Amount | Parts by Weight | 20 | 3 | 50 | 20 | 20 | 20 | 20 |
| | | Fiber Diameter | μm | 7 | 7 | 7 | 7 | 7 | 7 | 7 |
| | | [O/C] | — | 0.2 | 0.2 | 0.2 | 0.2 | 0.2 | 0.2 | 0.2 |
| | Organic Fibers (B) | Amount | Parts by Weight | 10 | 10 | 10 | 50 | 10 | 10 | 10 |
| | | Type | Type | PET 2 | PET 3 | PET 3 | PET 3 | PET 3 | PET 3 | PET 1 |
| | | Fiber Diameter | μm | 20 | 35 | 35 | 35 | 35 | 35 | 12 |
| | | Tensile Breakage Elongation | % | 15 | 15 | 15 | 15 | 15 | 15 | 15 |
| | Thermoplastic Resin (C) | Type | — | PP | PP | PP | PP | PP | PP | PP |
| | | Amount | Parts by Weight | 70 | 87 | 40 | 30 | 70 | 70 | 70 |
| | Compound (D) | Type | — | Terpene | Terpene | Terpene | Terpene | Terpene | Terpene | Terpene |
| | | Amount | Parts by Weight | 8 | 6 | 14 | 16 | 8 | 8 | 8 |
| Molding Material | Average Fiber Length | $L_B$ | mm | 7 | 7 | 7 | 7 | 7 | 7 | 7 |
| | Number Average Fiber Diameter | $d_B$ | μm | 20.1 | 35.0 | 35.1 | 35.0 | 35.0 | 35.1 | 12.1 |
| | Aspect Ratio | $L_B/d_B$ | — | 897 | 200 | 199 | 200 | 200 | 199 | 579 |
| Molded Article | Average Fiber Length | $L_A$ | mm | 1.1 | 1.0 | 0.7 | 0.3 | 0.2 | 0.3 | 1.0 |
| | Average Fiber Length | $L_B$ | mm | 2.7 | 2.9 | 2.9 | 2.8 | 1.2 | 0.4 | 2.6 |
| | Number Average Fiber Diameter | $d_B$ | μm | 20.1 | 35.0 | 35.1 | 35.0 | 35.0 | 35.1 | 12.0 |
| | Aspect Ratio | $L_B/d_B$ | — | 134 | 83 | 83 | 80 | 34 | 11 | 217 |
| | Ratio of Calculated Number | $n_B/n_A$ | — | 0.032 | 0.060 | 0.003 | 0.014 | 0.004 | 0.019 | 0.085 |
| Evaluation Results | Dispersibility | | — | A | A | C | D | A | A | A |
| | Charpy Impact Strength | | kJ/m² | 23.0 | 9.5 | 10.0 | 11.0 | 13.0 | 11.5 | 23.5 |
| | Flexural Strength | | MPa | 193 | 95 | 275 | 105 | 155 | 165 | 190 |
| | Surface Appearance | | — | C | B | D | D | B | B | C |

TABLE 6

| | | | | Comparative Example 8 | Comparative Example 9 | Comparative Example 10 |
|---|---|---|---|---|---|---|
| Raw Materials | Carbon Fibers (A) | Amount | Parts by Weight | 3 | 10 | 20 |
| | | Fiber Diameter | μm | 7 | 7 | 7 |
| | | [O/C] | — | 0.2 | 0.2 | 0.2 |
| | Organic Fibers (B) | Amount | Parts by Weight | 20 | 50 | 10 |
| | | Type | Type | PET 3 | PET 3 | PET 3 |
| | | Fiber Diameter | μm | 35 | 35 | 35 |
| | | Tensile Breakage Elongation | % | 15 | 15 | 15 |
| | Thermoplastic Resin (C) | Type | — | PP | PP | PP |
| | | Amount | Parts by Weight | 77 | 40 | 70 |
| | Compound (D) | Type | — | Terpene | Terpene | Terpene |
| | | Amount | Parts by Weight | 8 | 16 | 8 |
| Molding Material | Average Fiber Length | $L_B$ | mm | 7 | 7 | 7 |
| | Number Average Fiber Diameter | $d_B$ | μm | 35.0 | 35.0 | 35.0 |
| | Aspect Ratio | $L_B/d_B$ | — | 200 | 200 | 200 |
| Molded Article | Average Fiber Length | $L_A$ | mm | 1.1 | 0.7 | 0.2 |
| | Average Fiber Length | $L_B$ | mm | 3.0 | 2.7 | 2.5 |
| | Number Average Fiber Diameter | $d_B$ | μm | 35.0 | 35.0 | 35.0 |
| | Aspect Ratio | $L_B/d_B$ | — | 86 | 77 | 71 |
| | Ratio of Calculated Number | $n_B/n_A$ | — | 0.128 | 0.068 | 0.002 |
| Molding Material Constitution | Fiber Arrangement | | — | Unevenly distributed | Unevenly distributed | Evenly distributed |
| | Cross section of Fiber Bundle (E) | (A) includes (B) | — | — | — | — |
| | | (B) includes (A) | — | — | — | — |
| | | At least each one part of (A) and (B) contacts to (C) | — | YES | YES | YES |

TABLE 6-continued

|  |  |  | Comparative Example 8 | Comparative Example 9 | Comparative Example 10 |
|---|---|---|---|---|---|
| Evaluation Results | Dispersibility | — | A | D | D |
|  | Charpy Impact Strength | kJ/m² | 10.5 | 10.5 | 10.5 |
|  | Flexural Strength | MPa | 95 | 95 | 155 |
|  | Painted Surface Appearance | — | B | C | B |

TABLE 7

|  |  |  |  | Comparative Example 11 | Comparative Example 12 |
|---|---|---|---|---|---|
| Molding Material | Carbon Fiber Reinforced Thermoplastic Resin Molding Material (X-1) | Amount | Parts by Weight | 67 | 10 |
|  | Carbon Fiber Reinforced Thermoplastic Resin Molding Material (X-2) | Amount | Parts by Weight | — | — |
|  | Thermoplastic Resin (C) | Type | — | PP | PP |
|  |  | Amount | Parts by Weight | 33 | 70 |
|  | Organic Fiber Reinforced Thermoplastic Resin Molding Material (Y-1) Pellet Length 7 mm | Amount | Parts by Weight | — | — |
|  |  | Organic Fiber Type | — | — | — |
|  |  | Aspect Ratio $L_B/d_B$ | — | — | — |
|  |  | Tensile Breakage Elongation | % | — | — |
|  | Organic Fiber Reinforced Thermoplastic Resin Molding Material (Y-2) Pellet Length 7 mm | Amount | Parts by Weight | — | — |
|  |  | Organic Fiber Type | — | — | — |
|  |  | Aspect Ratio $L_B/d_B$ | — | — | — |
|  |  | Tensile Breakage Elongation | % | — | — |
|  | Organic Fiber Reinforced Thermoplastic Resin Molding Material (Y-3) Pellet Length 7 mm | Amount | Parts by Weight | — | 20 |
|  |  | Organic Fiber Type | Type | — | PET 4 |
|  |  | Aspect Ratio $L_B/d_B$ | — | — | 140 |
|  |  | Tensile Breakage Elongation | % | — | 15 |
|  | Organic Fiber Reinforced Thermoplastic Resin Molding Material (Y-4) (Manufactured by melt-kneading) PET2 Average Fiber Length 2.5 mm | Amount | Parts by Weight | — | — |
|  |  | Organic Fiber Type | Type | — | — |
|  |  | Aspect Ratio $L_B/d_B$ | — | — | — |
|  |  | Tensile Breakage Elongation | % | — | — |
| Molded Article | Average Fiber Length | $L_A$ | mm | 1.0 | 1.0 |
|  | Average Fiber Length | $L_B$ | mm | — | 2.9 |
|  | Number Average Fiber Diameter | $d_B$ | μm | — | 50.0 |
|  | Aspect Ratio | $L_B/d_B$ | — | — | 58 |
|  | Ratio of Calculated Number | $n_B/n_A$ | — | — | 0.029 |
| Evaluation Results | Productivity | — | — | B | B |
|  | Dispersibility | — | — | A | A |
|  | Charpy Impact Strength | kJ/m² |  | 9.0 | 10.0 |
|  | Flexural Strength | MPa |  | 238 | 95 |
|  | Painted Surface Appearance | — |  | A | B |

The materials prepared in Examples 1 to 13 were all excellent in dispersibility of the carbon fibers (A) and the organic fibers (B), and exhibited high impact strength (Charpy impact strength) and good surface appearance.

On the other hand, in Comparative Examples 1 and 7, the small number average fiber diameter of the organic fibers (B) resulted in insufficient surface appearance. In Comparative Examples 2, 8, and 12, the decreased content of the carbon fibers (A) resulted in low impact strength and low flexural strength. In Comparative Example 3, the increased content of the carbon fibers (A) caused poor dispersion in the molded article, resulting in low impact strength and poor surface appearance. In Comparative Examples 4 and 9, the increased content of the organic fibers (B) led to increased entanglement between the organic fibers (B), poor dispersion and poor surface appearance, and occurrence of fiber breakage due to increased contact between the fibers, thereby resulting in low impact strength. In Comparative Examples 5 and 6, the short average fiber length of the carbon fibers (A) or the organic fibers (B) led to a smaller fiber reinforcing effect, resulting in low impact strength. In Comparative Example 10, a uniformly mixed disposition of the carbon fibers (A) and the organic fibers (B) in an internal cross section of the fiber bundle (E) in the molding material led to increased entanglement between fibers in the fiber bundle (E), a shorter average fiber length of the carbon fibers (A), and uneven dispersion in the molded article, thereby resulting in low impact strength. In Comparative Example 11, the absence of the organic fibers (B) led to a smaller fiber reinforcing effect, resulting in low impact strength.

INDUSTRIAL APPLICABILITY

The fiber reinforced thermoplastic resin molded article has an excellent fiber dispersibility and excellent mechanical properties, particularly, impact strength and surface appearance, and thus is suitably used for electrical and electronic equipment, office automation equipment, household electrical appliances, housings, automotive parts and the like.

The invention claimed is:

1. A fiber reinforced thermoplastic resin molded article comprising: 5 to 45 parts by weight of carbon fibers (A); 1 to 45 parts by weight of organic fibers (B); and 10 to 94 parts by weight of a thermoplastic resin (C), based on 100 parts by weight of the total amount of the carbon fibers (A), the organic fibers (B), and the thermoplastic resin (C),
wherein the carbon fibers (A) have an average fiber length ($L_A$) of 0.3 to 3 mm, and
the organic fibers (B) have an average fiber length ($L_B$) of 0.5 to 5 mm, and a number average fiber diameter ($d_B$) of 35 to 300 μm.

2. The fiber reinforced thermoplastic resin molded article according to claim 1, wherein the organic fibers (B) have an aspect ratio ($L_B$ [μm]/$d_B$ [μm]) of 5 to 100.

3. The fiber reinforced thermoplastic resin molded article according to claim 1, wherein a ratio ($n_B/n_A$) of a calculated number $n_B$ of the organic fibers (B) to a calculated number $n_A$ of the carbon fibers (A) is 0.001 to 0.01.

4. The fiber reinforced thermoplastic resin molded article according to claim 3, wherein the organic fibers (B) have a number average fiber diameter ($d_B$) of 50 to 150 μm.

5. The fiber reinforced thermoplastic resin molded article according to claim 3, wherein the organic fibers (B) are at least one selected from the group consisting of polyamide fibers, polyester fibers, polyarylene sulfide fibers, and fluorine fibers.

6. A fiber reinforced thermoplastic resin molding material comprising: 5 to 45 parts by weight of carbon fibers (A); 1 to 45 parts by weight of organic fibers (B); 10 to 94 parts by weight of a thermoplastic resin (C); and 1 to 25 parts by weight of a compound (D) having a melt viscosity at 200° C. that is lower than that of the thermoplastic resin (C), based on 100 parts by weight of the total amount of the carbon fibers (A), the organic fibers (B), and the thermoplastic resin (C), wherein:
the organic fibers (B) have a number average fiber diameter ($d_B$) of 35 to 300 μm;
the thermoplastic resin (C) is contained at an outer side of a composite (F) obtained by impregnating a fiber bundle (E) comprising the carbon fibers (A) and the organic fibers (B) with the compound (D);
the carbon fibers (A) and the organic fibers (B) are unevenly distributed in a cross section of the fiber bundle (E); and
the length of the fiber bundle (E) and the length of the fiber reinforced thermoplastic resin molding material are substantially the same.

7. A fiber reinforced thermoplastic resin molding material comprising:
a carbon fiber reinforced thermoplastic resin molding material (X) comprising 5 to 45 parts by weight of carbon fibers (A), 35 to 94 parts by weight of a thermoplastic resin (C), and 1 to 25 parts by weight of a compound (D) having a melt viscosity at 200° C. that is lower than that of the thermoplastic resin (C), based on 100 parts by weight of the total amount of the carbon fibers (A), the thermoplastic resin (C), and the compound (D) having a melt viscosity at 200° C. that is lower than that of the thermoplastic resin (C), wherein the thermoplastic resin (C) is contained at an outer side of a composite (G) obtained by impregnating the carbon fibers (A) with the compound (D), and the length of the carbon fibers (A) and the length of the carbon fiber reinforced thermoplastic resin molding material are substantially the same; and
an organic fiber reinforced thermoplastic resin molding material (Y) comprising 1 to 45 parts by weight of organic fibers (B), 35 to 94 parts by weight of a thermoplastic resin (H), and 1 to 25 parts by weight of a compound (I) having a melt viscosity at 200° C. that is lower than that of the thermoplastic resin (H), based on 100 parts by weight of the total amount of the organic fibers (B), the thermoplastic resin (H), and the compound (I), wherein the organic fibers (B) have a number average fiber diameter ($d_B$) of 35 to 300 μm.

8. The fiber reinforced thermoplastic resin molding material according to claim 6, wherein the organic fibers (B) have an aspect ratio ($L_B/d_B$) of 10 to 500.

9. The fiber reinforced thermoplastic resin molding material according to claim 6, wherein the organic fibers (B) are at least one selected from the group consisting of polyamide fibers, polyester fibers, polyarylene sulfide fibers, and fluorine fibers.

10. The fiber reinforced thermoplastic resin molding material according to claim 7, wherein the organic fibers (B) have an aspect ratio ($L_B/d_B$) of 10 to 500.

11. The fiber reinforced thermoplastic resin molding material according to claim 7, wherein the organic fibers (B) are at least one selected from the group consisting of polyamide fibers, polyester fibers, polyarylene sulfide fibers, and fluorine fibers.

* * * * *